United States Patent
Sundaram

(10) Patent No.: US 10,008,036 B2
(45) Date of Patent: Jun. 26, 2018

(54) SYSTEM AND METHOD FOR GENERATING A MESH

(71) Applicant: ANSYS, Inc., Canonsburg, PA (US)

(72) Inventor: Ravi Sundaram, Bethel Park, PA (US)

(73) Assignee: Ansys, Inc., Canonsburg, PA (US)

( * ) Notice: Subject to any disclaimer, the term of this patent is extended or adjusted under 35 U.S.C. 154(b) by 335 days.

(21) Appl. No.: 14/093,349

(22) Filed: Nov. 29, 2013

(65) Prior Publication Data

US 2014/0160127 A1 Jun. 12, 2014

Related U.S. Application Data

(60) Provisional application No. 61/735,213, filed on Dec. 10, 2012.

(51) Int. Cl.
G06T 17/20 (2006.01)
G06T 17/10 (2006.01)

(52) U.S. Cl.
CPC ............ *G06T 17/205* (2013.01); *G06T 17/10* (2013.01); *G06T 17/20* (2013.01)

(58) Field of Classification Search
None
See application file for complete search history.

(56) References Cited

U.S. PATENT DOCUMENTS

| 7,050,951 B1 | 5/2006 | Tautges et al. | |
| 2007/0245275 A1* | 10/2007 | Jandhyala | G06F 17/5036 716/55 |
| 2009/0030660 A1 | 1/2009 | Celik et al. | |

OTHER PUBLICATIONS

Barry Dyne, David Bernstein, "A Correct-By-Construction Approach to MEMS Design and Analysis", Apr. 1999, SPIE, Part of the Symposium on Design. Test, and Microfabrication of MEMS and MOEMS, pp. 142-149.*
z. Tan, M. Furmanczyk, M. Turowski, and A. Przekwas, "CFD-Micromesh: A Fast Geometric Modeling and Mesh Generation Tool for 3D Microsystem Simulations", Apr. 10, 2000, SPIE, Proc. SPIE 4019, Design, Test, Integration, and Packaging of MEMS/MOEMS, pp. 193-199.*
B. Zalik, "Merging a set of polygons", 2001, Elsevier, Computers & Graphics 25, pp. 77-88.*
Rajendran Pullat, "Manufacturing Feature Recognition by 3D Solid Model Slicing and Contour Based Geometric Reasoning", Oct. 7, 2010, University of Cincinnati, Thesis.*

(Continued)

*Primary Examiner* — Robert Bader

(74) *Attorney, Agent, or Firm* — Jones Day

(57) ABSTRACT

In a system for facilitating mesh generation corresponding to a volumetric, prismatic object, generalized polyhedrons representing at least a portion of a layer of the volumetric object are transformed into a set of convex polyhedrons based on, at least in part, the prismatic properties of the volumetric object. The convex polyhedrons corresponding to a layer are decomposed into a set of tetrahedrons by accounting for an intersecting and/or overlapping edge of a polyhedron in an adjacent layer, so that the set of tetrahedrons automatically, i.e., without having to enforce any continuity requirements after tetrahedron generation, forms a mesh of that is continuous with tetrahedrons corresponding to the adjacent layer.

17 Claims, 28 Drawing Sheets

(56) References Cited

OTHER PUBLICATIONS

Mirko Spasojevic, Per Ljung, Martin Bachtold, "Creation of 3D Surface Models From 2D Layouts for BEM Analysis", 2000, Proc. Int. Conf. on Modeling and Simulation of Microsystems MSM 2000.*

Y. Lu, R. Gadh, T.J. Tautges, "Feature based hex meshing methodology: feature recognition and volume decomposition", 2001, Elsevier, Computer-Aided Design 33, pp. 221-232.*

Shang-Sheng Liu, Rajit Gadh, "Automatic Hexahedral Mesh Generation by Recursive Convex and Swept Volume Decomposition",1997, Sandia National Laboratories, $6^{th}$ International Meshing Roundtable, pp. 217-231.*

Jarek R. Rossignac, Michael A. O'Connor, "SGC: A Dimension-Independent Model for Pointsets with Internal Structures and Incomplete Boundaries", 1989, IBM, Geometric Modeling for Product Engineering, pp. 145-180.*

Extended European Search Report from related EP 13196525.3 dated Nov. 16, 2017.

* cited by examiner

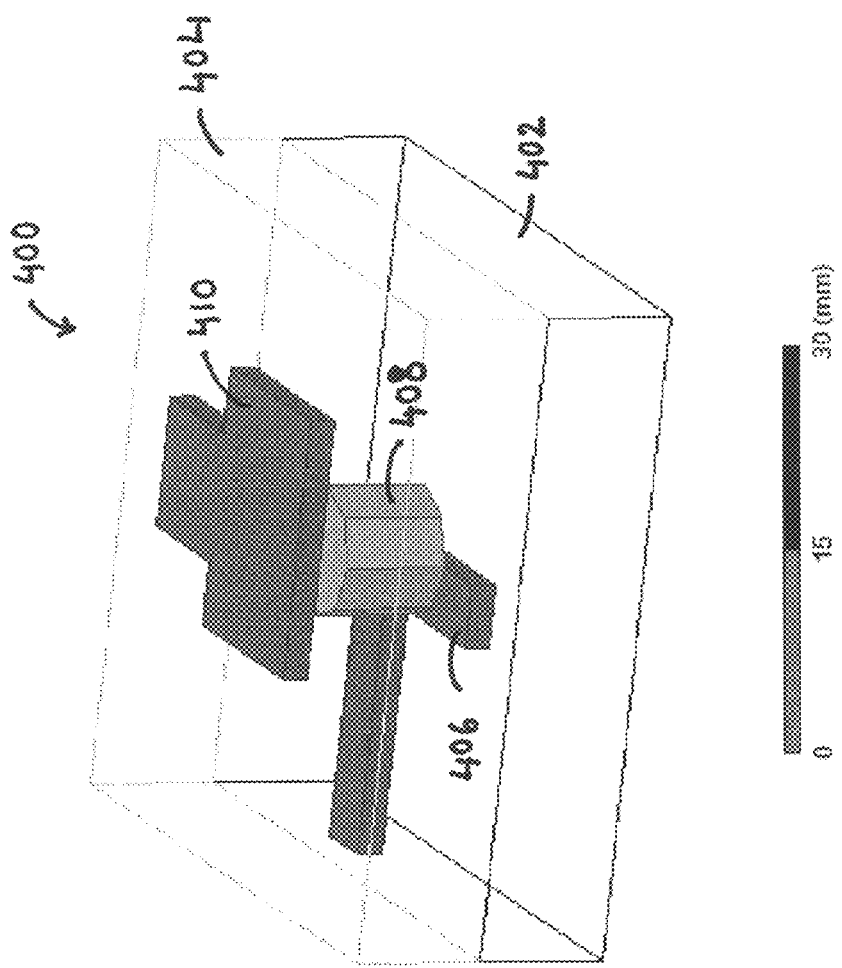

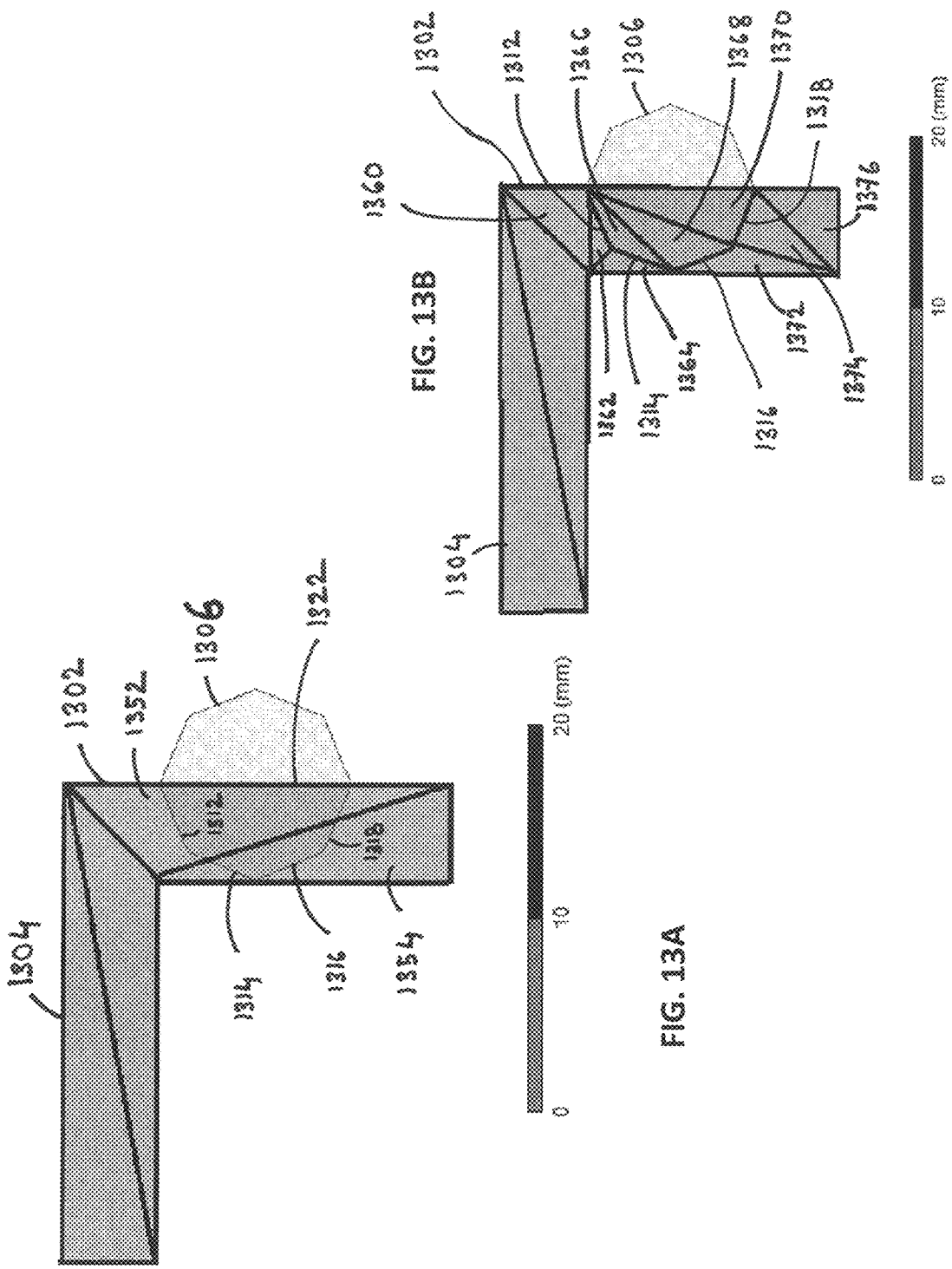

SYSTEM AND METHOD FOR GENERATING A MESH

CROSS REFERENCE TO RELATED APPLICATIONS

This application claims priority to and benefit of U.S. Provisional Patent Application No. 61/735,213, filed on Dec. 10, 2012, which is incorporated herein by reference in its entirety.

FIELD OF THE INVENTION

The present invention generally relates to computer systems and methods for modeling complex industrial structures to facilitate analysis and/or design thereof, and in particular to systems and methods for generating meshes representing such structures.

BACKGROUND OF THE INVENTION

In general, a mesh includes elements, which typically are simple shapes such as tetrahedrons, hexahedrons, prisms, and pyramids. These simple shapes have faces, edges, and vertices. A mesh is simply a collection of these elements and the mathematical description of the relationship between the nodes, edges, faces and the elements. If the vertex of one element lies in the interior of the edge of another element, that vertex is a hanging node. As depicted in FIG. 1, the edge 102 ends at a node 104 in the middle of the edge 106. The node 104 is typically called a hanging node. If an edge of one element is on the face of another element that edge is typically called a hanging edge. The elements of a tetrahedral mesh are tetrahedrons and the mesh can be non-continuous or continuous. In a continuous mesh there are no hanging nodes on edges, there are no hanging edges on tetrahedral faces, the elements do not intersect one another, there are no gaps between the elements, and no element cuts across the surface of any other element.

In numerical analysis of industrial systems or structures, complicated three-dimensional shapes are commonly broken down into, or approximated by, a tetrahedral mesh, in the process of setting up and/or solving equations for finite element analysis, especially in the numerical solution of partial differential equations. Such meshes have wide applications in practical applications in computational fluid dynamics, aerodynamics, electromagnetic fields, civil engineering, chemical engineering, naval architecture and engineering, and related fields. Tetrahedral meshes that are continuous, i.e., the tetrahedrons forming the mesh do not intersect or overlap with each other, can be particularly beneficial in the analysis and/or design of various physical systems and structures such as printed circuit boards, integrated circuits, cable systems including optical fiber communication systems, and bundled cable systems used in vehicles, conduit systems used in the oil and gas industry, silicon and other substrates, redistribution layers, electronic packages, and microwave devices, because continuous mesh based analysis/design is often more efficient. For example, relative to using other analysis techniques, using a continuous mesh can decrease the analysis/design time, resources requirements in terms of the number of processors, memory size, etc.

Meshes can represent prismatic objects. A prism is typically a polyhedron created by taking a polygon and sweeping it along a vector. If the vector is perpendicular to the polygon the resulting prism is called a right prism, such as the hexagonal prisms 202 depicted in FIG. 2A. If the vector is not perpendicular to the polygon, the resulting prism is called an oblique prism. The polygon being swept usually does not include holes, and is usually convex.

With reference to FIG. 2B, an extrusion is similar to a prism, but the cross section being swept may include holes. Alternatively or in addition, the cross section may be concave. The objects obtained by sweeping polygons having holes and/or other concavities are prismatic, but they are typically not called prisms; instead, they are commonly called extrusions. The prismatic objects 204 have holes and the prismatic object 206 has both a hole and a concavity. The extrusions, i.e., prismatic objects 204, 206 are swept in a Z direction through a short distance relative to the dimensions of these objects in the X-Y cross-sectional plane. The prisms 202 are swept through a relatively longer distance in the Z direction. In general, however, any particular relationship between the dimensions in X, Y, and Z directions is not required. Prismatic objects including prisms and extrusions may have any dimensions in the X-Y cross-sectional plane and in the Z direction.

In general, a volumetric object is an object that encloses a volume, and can be a solid, a liquid, a gas, or a combination any two or all three. A sheet object generally has an area, but lacks any substantial thickness or volume, and a wire object generally has a length, but lacks any substantial area and volume. Cartesian non boundary conformal meshing methods for generating meshes of volumetric objects generally divide space along the coordinate axes into octants/quadrants, recursively divide the octants/quadrants that cut the volumetric objects to be meshed, and usually create a hexahedral non-boundary conformal mesh. Insert-point-and-swap methods typically create a convex hull that contains all of the volumetric objects to be meshed, then insert vertices one by one into the mesh until all vertices of the volumetric objects are in the mesh. All elements cutting through object surfaces are cut repeatedly, until no element cuts across any surface of any object. Volume Decomposition methods divide the space with a large number of elements of desired shape, and recursively subdivide all elements that cut across object surfaces, and terminate after a specified number of levels or when the element size is not larger than a specified threshold. The vertices of the elements are then adjusted to prevent them from crossing surfaces.

These generic methods can be very slow, often taking hours to generate a continuous mesh representing a complex structure. In some instances, these techniques are simply unable to generate a mesh for a specified structure. Improved methods and systems for generating continuous meshes representing volumetric objects are therefore needed.

SUMMARY OF THE INVENTION

Various embodiments of the present invention feature techniques for efficiently generating a continuous mesh representing a complex physical structure including one or more volumetric objects. This is achieved, at least in part, by taking advantage of the prismatic properties of the volumetric objects and/or the fact that the geometry of certain prismatic structures is a built up of strata or layers. In particular, one or more individual prismatic objects included in a volumetric object received as input are split at the layer boundaries. The individual prismatic objects in each layer are decomposed into generalized polyhedrons, and the generalized polyhedrons are transformed into convex polyhedrons. This transformation takes advantage of the prismatic properties of the individual prismatic objects, and can thus improve the efficiency of the overall mesh generation process. The convex polyhedrons at each layer are then decomposed into tetrahedrons, while accounting for the convex polyhedrons at the adjacent layer or layers. As such, the decomposition automatically produces a continuous tetrahedral mesh and, unlike conventional decomposition methods, it is not necessary to transform a non-continuous mesh into a continuous mesh. As used herein, automatically generally means without having to enforce any continuity requirements after tetrahedron generation, to make the mesh continuous. This adjacent polyhedron aware decomposition can further improve the efficiency of mesh generation.

Accordingly, in one aspect, a method for facilitating generation of a mesh corresponding to a volumetric object includes transforming, by a processor coupled to a memory, a first generalized polyhedron stored in the memory into a first set of convex polyhedrons. The first generalized polyhedron represents at least a portion of a first layer of the volumetric object. The transformation includes representing the first generalized polyhedron as a polygon, and decomposing the polygon into a corresponding set of convex polygons. The transformation also includes reconstructing the first set of convex polyhedrons from the set of convex polygons by sweeping each convex polygon in the set of convex polygons in a Z direction.

The volumetric object may include a solid, a liquid, a gas, a combination of any two and/or all three of the solid, liquid, and gas. A length of the sweep may correspond to a thickness of the first layer. The method may further include converting the first set of convex polyhedrons into a first set of tetrahedrons. A mesh generated by the method, e.g., a mesh including the first set of tetrahedrons, can facilitate analysis of response of the volumetric object to a physical condition such as electromagnetic stimulation, physical stress, etc.

In some embodiments, the method further includes transforming, by the processor, a second generalized polyhedron stored in the memory into a second set of convex polyhedrons. The second generalized polyhedron may represent at least a portion of a second layer of the volumetric object, and the second layer may be adjacent to the first layer. The method may further include selecting a convex polyhedron in the first set of convex polyhedrons, and converting the selected polyhedron in the first set into a first set of tetrahedrons. The conversion may be based on at least in part an adjacent convex polyhedron in the second set of convex polyhedrons, and may be designed to cause the first set of tetrahedrons to form automatically, i.e., without having to enforce any continuity requirements after tetrahedron generation, a mesh of tetrahedrons that is continuous with a second set of tetrahedrons corresponding to the second set of convex polyhedrons.

In some embodiments, the conversion includes imprinting an edge of the adjacent convex polyhedron onto the selected convex polyhedron, and constructing at least two tetrahedrons corresponding to the selected convex polyhedron. Each of the two or more tetrahedrons are constructed to include the imprinted edge, and those tetrahedrons are included in the first set of tetrahedrons. The method may additionally include selecting another, different convex polyhedron in the first set of convex polyhedrons, and repeating the conversion step for the selected other convex polyhedron. The conversion of the selected polyhedron into the first set of tetrahedrons may include interior point decomposition, surface vertex decomposition, or both.

In some embodiments, the method further includes selecting a convex polyhedron in the second set of convex polyhedrons and converting the selected polyhedron in the second set into a second set of tetrahedrons. The conversion may be based on at least in part an adjacent convex polyhedron in the first set of convex polyhedrons, so as to form automatically, i.e., without having to enforce any continuity requirements after tetrahedron generation, a continuous mesh of tetrahedrons that includes the first and second sets of tetrahedrons.

In some embodiments, the method includes receiving in the memory a specification of the volumetric object, and identifying by the processor, the first layer of the volumetric object. The first layer may correspond to a first Z coordinate. The method also includes generating by the processor a layer representation of the first layer. The layer representation includes the first generalized polyhedron. The generation of the layer representation may include deriving a set of polygons corresponding to a cross-section of the first layer at a Z location. One or more of the polygons in the set are then modified by removing an overlap between two polygons in the set, an intersection of two polygons in the set, or both, to obtain a non-overlapping, non-intersecting set of polygons. In addition, the generation of the layer representation may include sweeping each polygon in the non-overlapping, non-intersecting set of polygons in a Z direction, so as to obtain the layer representation that includes the first generalized polygon. A length of the sweep may corresponds to a thickness of the first layer.

In some embodiments, the received specification include one or more of a specification of circuitry, a specification of a cable system, and a specification of a fluidic conduit system. Circuitry may include printed circuit boards, electrical CAD layouts, substrates, redistribution layer, electronic packages, optical fiber communication systems, and microwave devices and systems. The received specification may be specified using a format including one or more of a set of surface triangles, IGES, STEP, and STL. Alternatively or in addition, the format may include a geometry exchange format such as ACIS, CATIA, and SDRC. The format may also include an electronic CAD (ECAD) system database such as GDS-II, ODB++, the OpenAccess database, Cadence Allegro, Mentor Expedition, Mentor PADS, Mentor Boardstation, Zuken CR-5000, and Zuken CR-8000.

In some embodiments, the method includes determining if the received specification represents a prismatic volumetric object. The determination may include selecting a Z direction and obtaining a first cross-section of a volumetric object in the specification in a first plane having a normal substantially in the selected Z direction. In other words, the selected Z direction is perpendicular to the first plane. The determination may further include obtaining a second cross-section of the volumetric object in a second, different plane that is substantially parallel to the first plane, and checking if the first and second cross-sections are substantially identical. The volumetric object may be identified as prismatic if the first and second cross-sections are determined to be substantially identical. In some embodiments, the volumetric object, which may be prismatic, corresponds to circuitry that includes at least one conducting layer, at least one dielectric layer, and one or more of a via, a trace, and a port.

In another aspect, a system for facilitating generation of a mesh corresponding to a volumetric object, to further facilitate analysis of response of the volumetric object to a physical condition, includes a polyhedron generator and transformer in communication with a memory. A first generalized polyhedron representing at least a portion of a first layer of the volumetric object may be stored in the memory. The polyhedron generator and transformer is adapted to represent the first generalized polyhedron as a polygon, and to decompose the polygon into a corresponding set of convex polygons. The polyhedron generator and transformer is also adapted to sweep each convex polygon in the set of convex polygons in a Z direction, thus reconstructing the first set of convex polyhedrons from the set of convex polygons, and transforming the first generalized polyhedron into a first set of convex polyhedrons.

In some embodiments, the system includes a polyhedron decomposer adapted to select a convex polyhedron in the first set of convex polyhedrons, and to select an adjacent convex polyhedron corresponding to an adjacent second layer. In addition, the polyhedron decomposer is adapted to imprint an edge of the adjacent convex polyhedron onto the selected convex polyhedron, and to construct a first set of tetrahedrons including at least two tetrahedrons corresponding to the selected convex polyhedron. Each of the two or more tetrahedrons is constructed to include the imprinted edge, thereby converting, at least in part, the selected polyhedron into the first set of tetrahedrons that is designed to form automatically, i.e., without having to enforce any continuity requirements after tetrahedron generation, a mesh of tetrahedrons that is continuous with a second set of tetrahedrons corresponding to the adjacent second layer.

In some embodiments, the system includes an input-output module adapted to receive and store in the memory a specification of the volumetric object. The system may also include a layer analyzer adapted to identify the first layer of the volumetric object. The first layer may correspond to a first Z co-ordinate. The layer analyzer may also be adapted to derive a set of polygons corresponding to a cross-section of the first layer at a Z location. Moreover, the layer analyzer may be adapted to remove from at least one of the polygons in the set an overlap between two polygons in the set, an intersection of two polygons in the set, or both, so as to obtain a non-overlapping, non-intersecting modified set of polygons. Finally, the layer analyzer may be adapted to sweep each polygon in the modified set of polygons in a Z direction, to obtain a layer representation of the first layer that includes the first generalized polygon, and to store the first generalized polyhedron in the memory.

In another aspect, an article of manufacture including a non-transitory machine-readable medium storing instructions that, when executed by a machine comprising a memory and a processor in electronic communication with the memory, configure the processor to facilitate generation of a mesh corresponding to a volumetric object, to further facilitate analysis of response of the volumetric object to a physical condition. A first generalized polyhedron representing at least a portion of a first layer of the volumetric object may be stored in the memory. The stored instructions configure the processor to represent the first generalized polyhedron as a polygon, and to decompose the polygon into a corresponding set of convex polygons. The stored instructions also configure the processor to sweep each convex polygon in the set of convex polygons in a Z direction, thus reconstructing the first set of convex polyhedrons from the set of convex polygons, and transforming the first generalized polyhedron into a first set of convex polyhedrons.

In some embodiments, the stored instructions configure the processor to select a convex polyhedron in the first set of convex polyhedrons, and to select an adjacent convex polyhedron corresponding to an adjacent second layer. In addition, the stored instructions configure the processor to imprint an edge of the adjacent convex polyhedron onto the selected convex polyhedron, and to construct a first set of tetrahedrons including at least two tetrahedrons corresponding to the selected convex polyhedron. The instructions configure the processor to construct each of the two or more tetrahedrons to include the imprinted edge, thereby converting, at least in part, the selected polyhedron into the first set of tetrahedrons that is designed to form automatically, i.e., without having to enforce any continuity requirements after tetrahedron generation, a mesh of tetrahedrons that is continuous with a second set of tetrahedrons corresponding to the adjacent second layer.

In some embodiments, the instructions configure the processor to receive and store in the memory a specification of the volumetric object. In addition, the instructions configure the processor to identify the first layer of the volumetric object. The first layer may correspond to a first Z co-ordinate. The stored instructions may also configure the processor to derive a set of polygons corresponding to a cross-section of the first layer at a Z location, and to remove from at least one of the polygons in the set an overlap between two polygons in the set, an intersection of two polygons in the set, or both, so as to obtain a non-overlapping, non-intersecting modified set of polygons. Finally, the stored instructions may configure the processor to sweep each polygon in the modified set of polygons in a Z direction, to obtain a layer representation of the first layer that includes the first generalized polygon, and to store the first generalized polyhedron in the memory.

BRIEF DESCRIPTION OF THE DRAWINGS

Various embodiments of the present invention taught herein are illustrated by way of example, and not by way of limitation, in the figures of the accompanying drawings, in which:

FIGS. 4A-4E schematically depict various views of exemplary volumetric objects that can be processed in accordance with various embodiments of the present invention;

FIG. 13A also schematically depicts conversion of convex polyhedrons into overlapping and/or intersecting tetrahedrons, in accordance with one embodiment of the present invention;

FIGS. 13B and 13C schematically depict conversion of convex polyhedrons into non-overlapping and non-intersecting tetrahedrons, in accordance with various embodiments of the present invention;

DETAILED DESCRIPTION OF THE INVENTION

Figure 1:
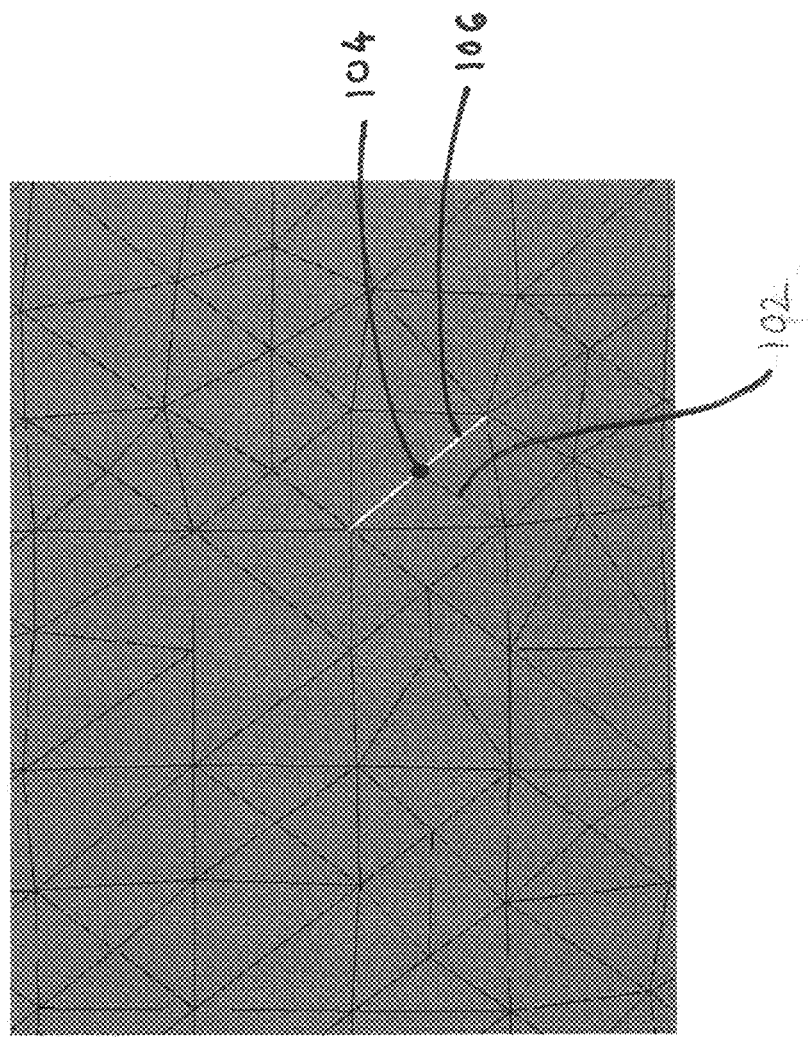
FIG. 1 schematically depicts a non-continuous mesh.
Figure 2A:
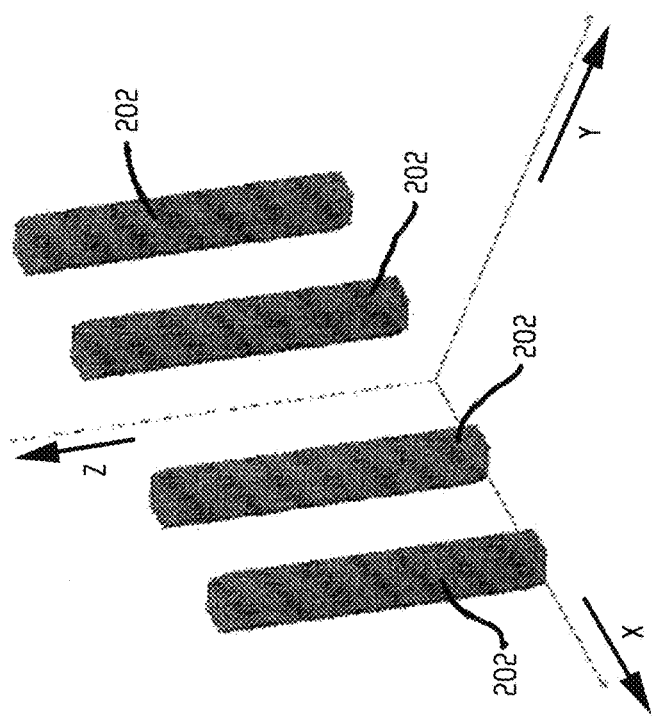
FIGS. 2A and 2B depict various prismatic objects.
Figure 2B:
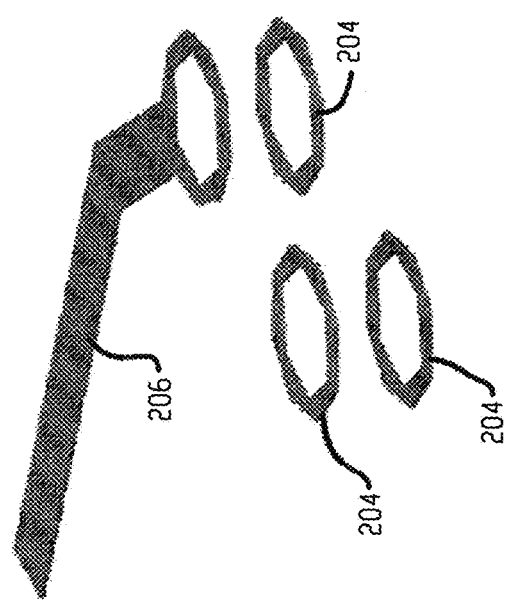
Figure 3:
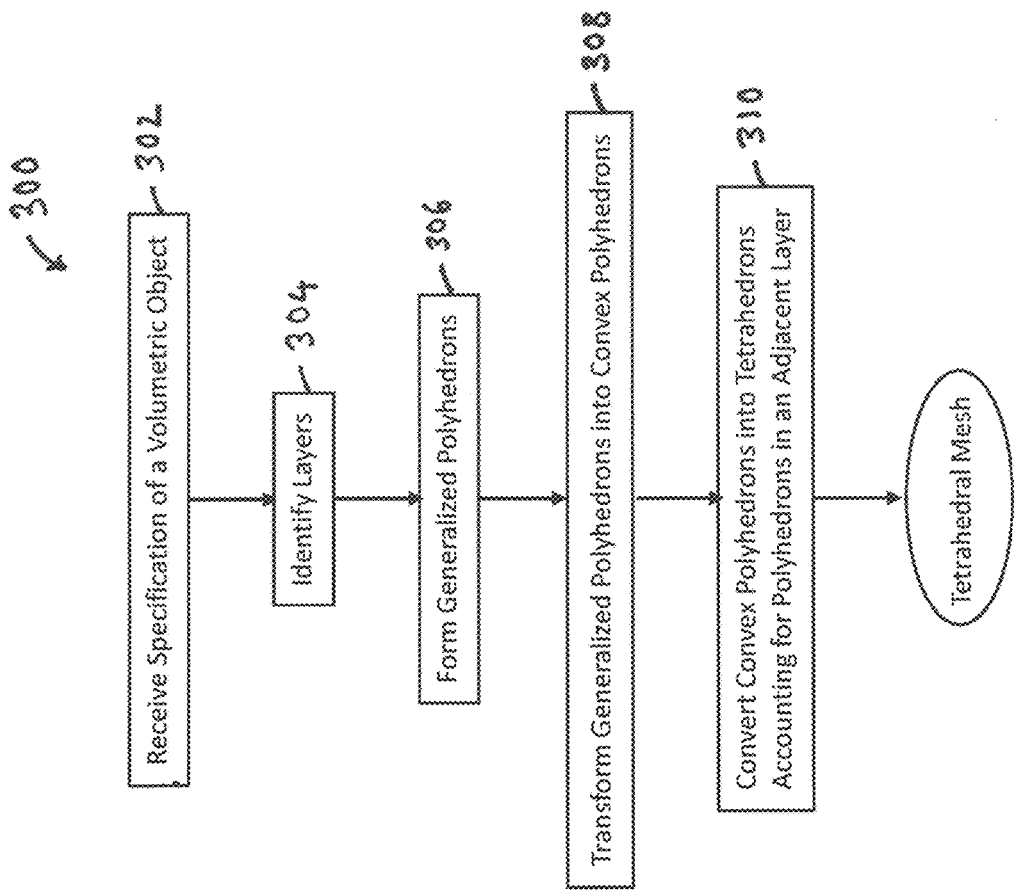
FIG. 3 illustrates an exemplary process for generating a continuous mesh, in accordance with one embodiment of the present invention.
Figure 4A:
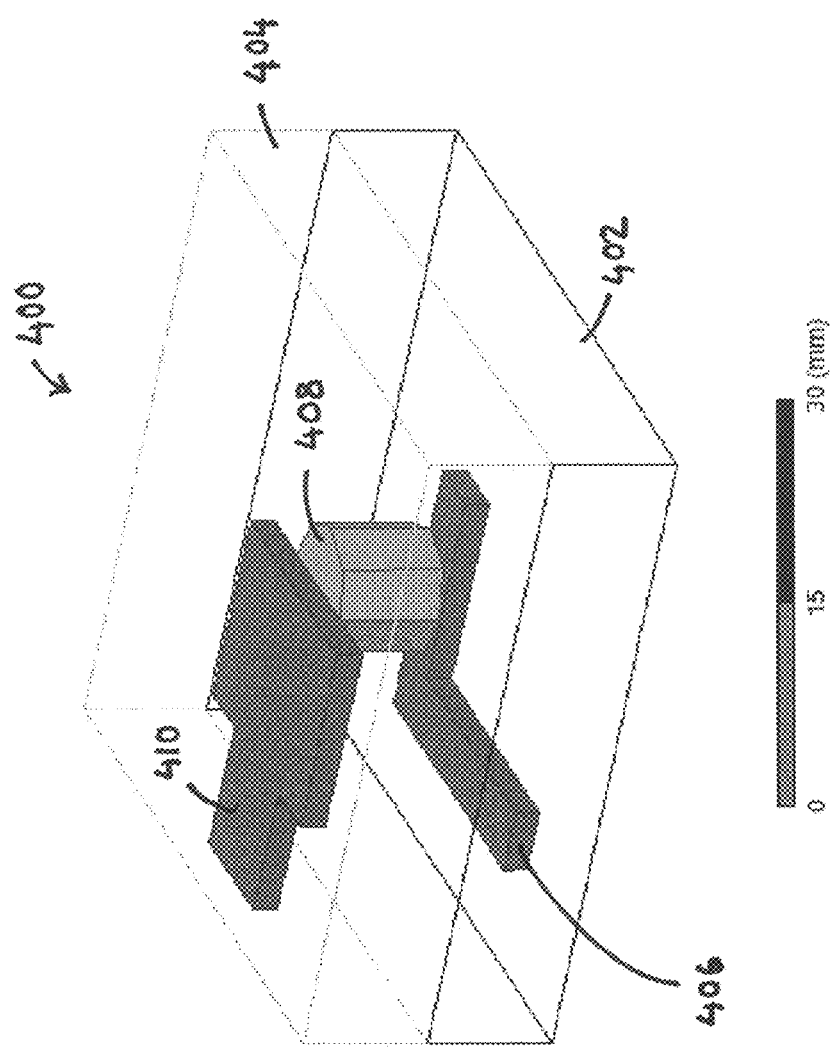
Figure 4C:
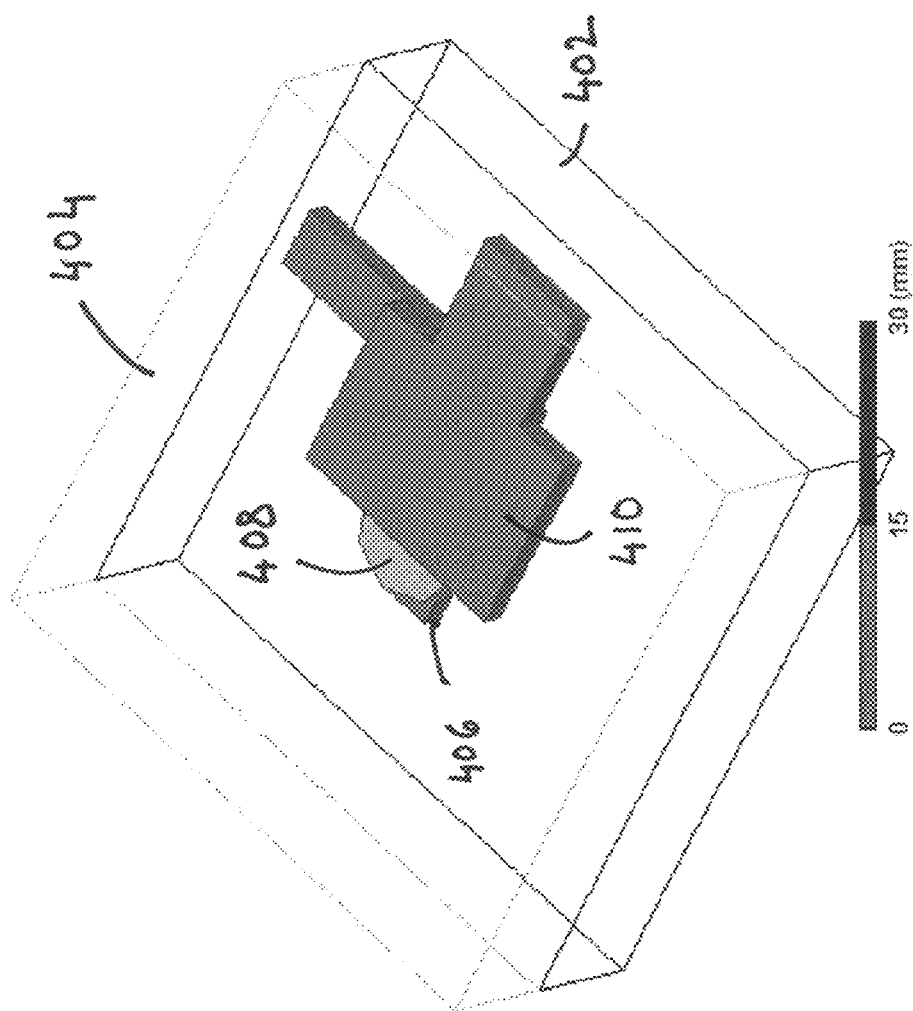
Figure 4D:
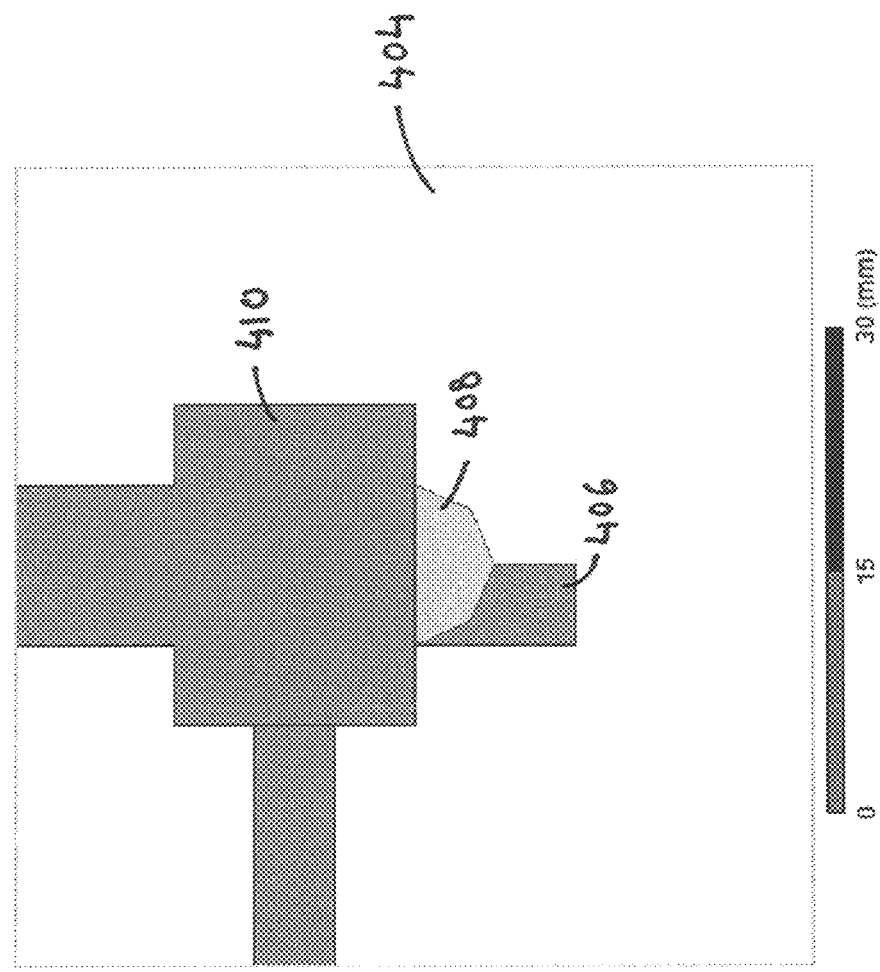
Figure 4E:
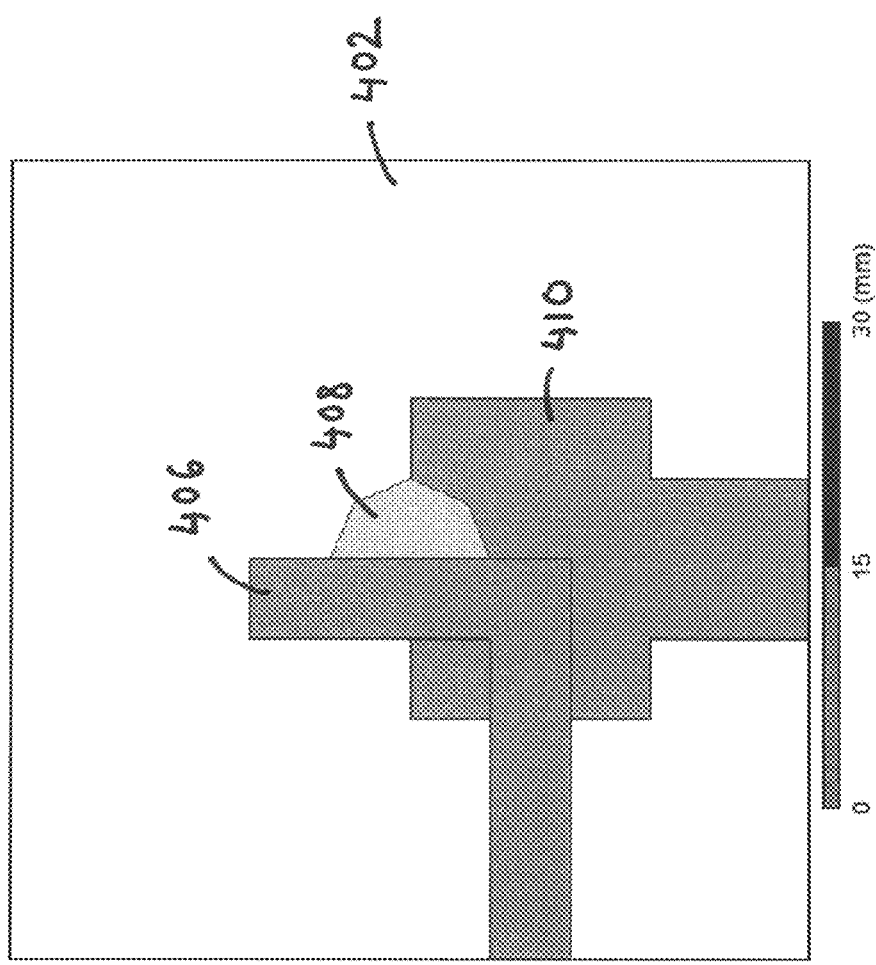

With reference to FIG. 3, an exemplary mesh generation process 300 receives a specification of a system or structure to be analyzed at step 302. The specification of a structure and the geometry thereof may be described as a set of surface triangles for each volumetric object. A volumetric object can include several (e.g., 10, 100, 1,000, 10,000, etc.) individual volumetric objects. Various embodiments do not depend on this particular way of describing the structure specification/geometry, and the geometry and other properties of the structure to be analyzed can be described using many other methods and formats such as industry standard geometry definition formats such as IGES, STEP, or STL, or proprietary geometry exchange formats such as ACIS, CATIA, and SDRC. The specification of a structure can also be specified using electronic CAD (ECAD) system databases such as GDS-II, ODB++, the OpenAccess database, Cadence Allegro, Mentor Expedition, Mentor PADS, Mentor Boardstation, Zuken CR-5000, and Zuken CR-8000. Some exemplary structures that can be represented as a continuous mesh using the process 300 include printed circuit boards, integrated circuits, electrical CAD layouts, cable systems including optical fiber communication systems, and bundled cable systems used in planes, trains, automobiles, and ships, conduit systems used in the oil and gas industry, having relatively small pipes enclosed within other pipes, silicon and other substrates, redistribution layers, electronic packages, and microwave devices. Some of the volumetric objects received in the specification may contain, or be contained inside other volumetric objects. Some of the received volumetric objects may can cut across and intersect with other volumetric objects.

At step 304, various layers in the received specification are identified. To this end, the input specification is processed determine specific Z values where layer transitions occur. By convention, the structure is generally parallel to the X-Y plane and the layers, referred to as Z layers, are stacked in the Z direction. In step 304, prior to identification layers or thereafter, it can be optionally verified that the received individual volumetric objects are prismatic. If any object is determined not to be prismatic, the mesh generation process may terminate. To this end, for each object a cross section in the X-Y plane is obtained at a certain Z location. Another cross-section in the X-Y plane is obtained for that object at a different Z location. If the two cross-sections are not substantially identical, the object is determined to be not a prismatic object.

At step 306, the volumetric objects corresponding to each layer are represented as generalized polyhedrons that are not necessarily convex. The generalized polyhedrons are transformed into convex polyhedrons using the prismatic properties of the corresponding volumetric objects at step 308. At step 310 the convex polyhedrons are converted into tetrahedrons while accounting for the edges of one or more polyhedrons in the adjacent layer or layers. This produces a tetrahedral mesh that is continuous.

With reference to FIGS. 4A-4E, an exemplary volumetric object 400 includes five individual volumetric objects. Each of these individual objects has a certain length, width, and thickness. The first volumetric object 402 is water and the second volumetric object 404 is air, disposed over the water object 402. A volumetric object trace_L 406 is made using copper, and is located within the water object 402. A via 408, in the shape of an octagonal prism and made using gold, is disposed over the trace_L object 406. A part of the via 408 is located within the water object 402 and another part is located within the air object 404. Finally, a trace_T object 410, also made using copper, is located above the via 408, within the air object 204.

Figure 5B:
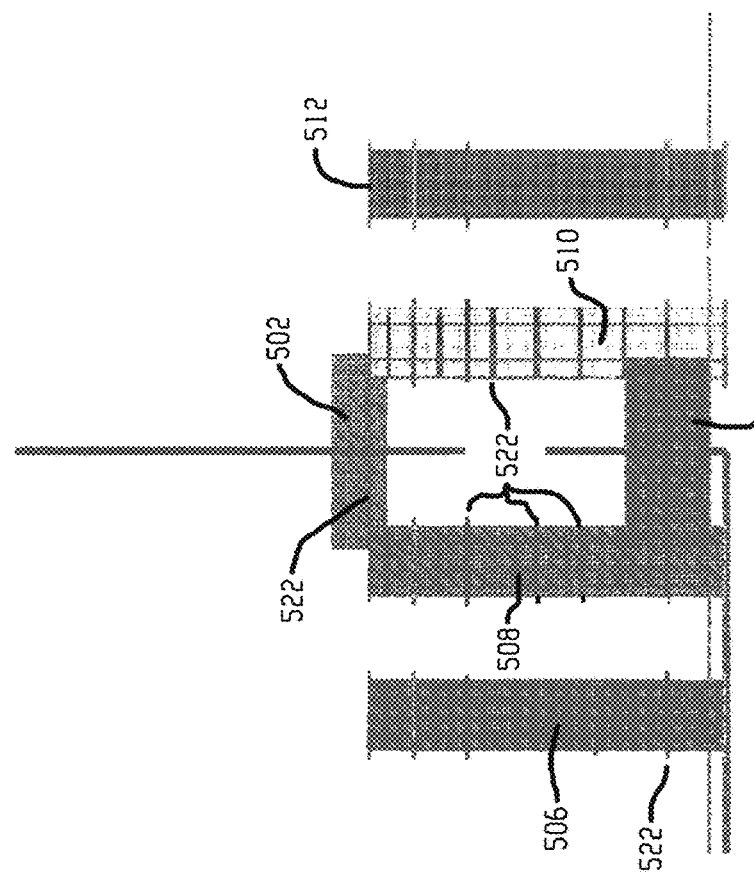
FIG. 5B schematically depicts layer decomposition of the exemplary objects depicted in FIG. 5A.
Figure 5A:
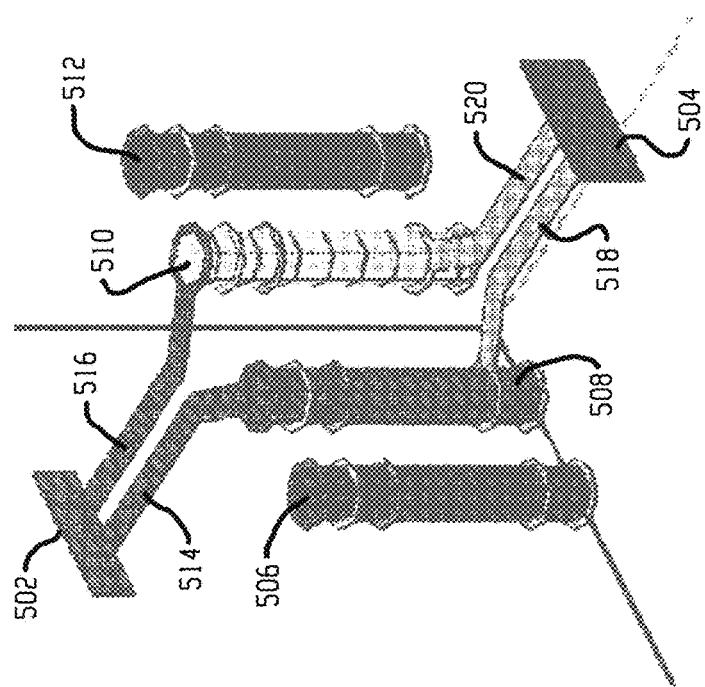
FIG. 5A schematically depicts exemplary prisms and extrusions that can be processed in accordance with various embodiments of the present invention.

It should be understood that the volumetric object 400 is illustrative only, and that volumetric objects having as few as two and as many has 10, 50, 100, 600, 1000, 2000, 10,000 individual volumetric objects are within the scope of the present invention. One or more of these individual objects may include or may consist essentially of various materials, e.g., solids such as metals, plastics, ceramics, semiconductors, and dielectrics, liquids such as chemicals and oils, and various gases. One or more of these individual objects may also have shapes other than L, T, and octagonal shapes, such as triangular, rectangular, and concave and convex polygonal shapes. For example, FIG. 5A illustrates ports 502, 504 that are rectangular, vias 506-512 that are hexagonal, and traces 514-520 that are concave extrusions. Such volumetric objects are typically created by circuit layout tools. In general, any individual object can have any of the prismatic shapes including extrusions.

Figure 6A:
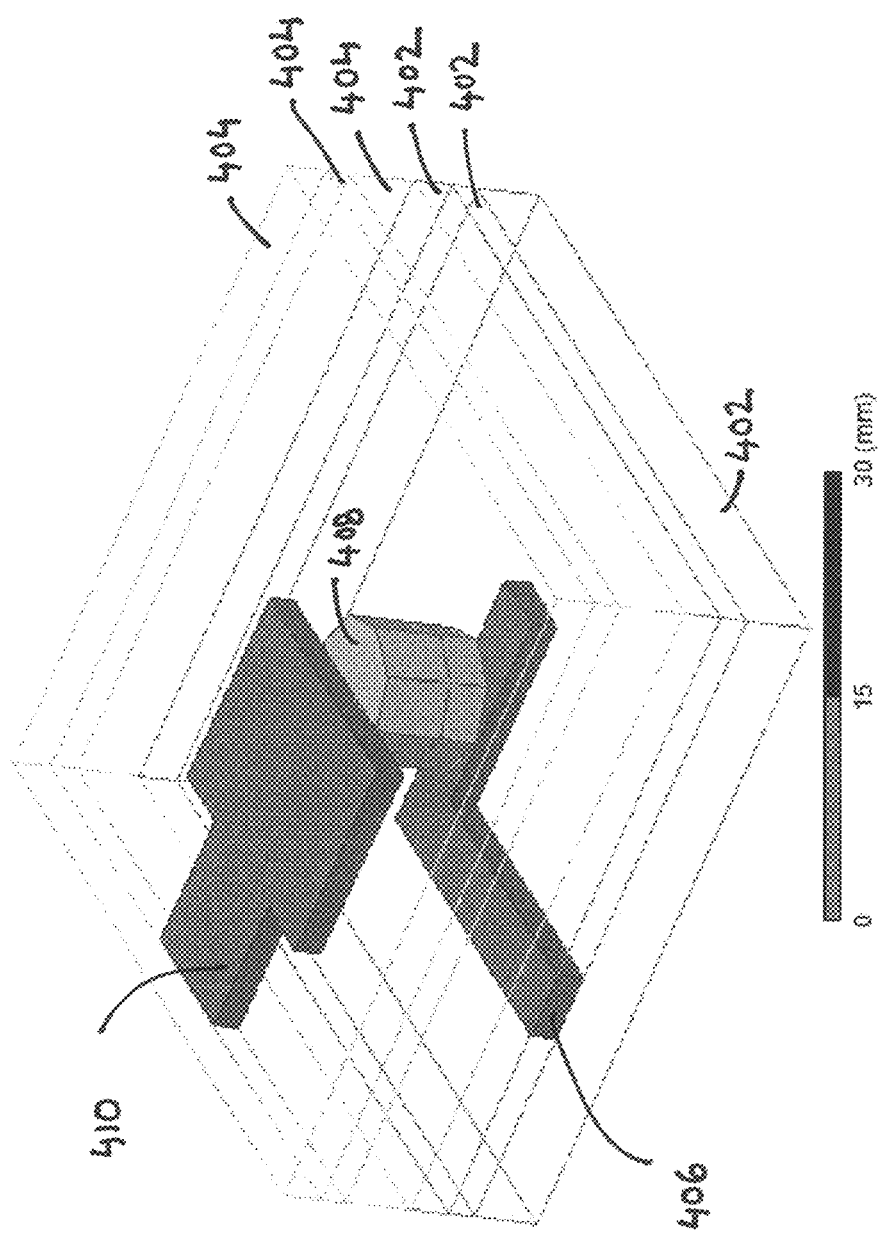
FIGS. 6A and 6B illustrate layer decomposition of the exemplary objects depicted in FIGS. 4A-4E.
Figure 6B:
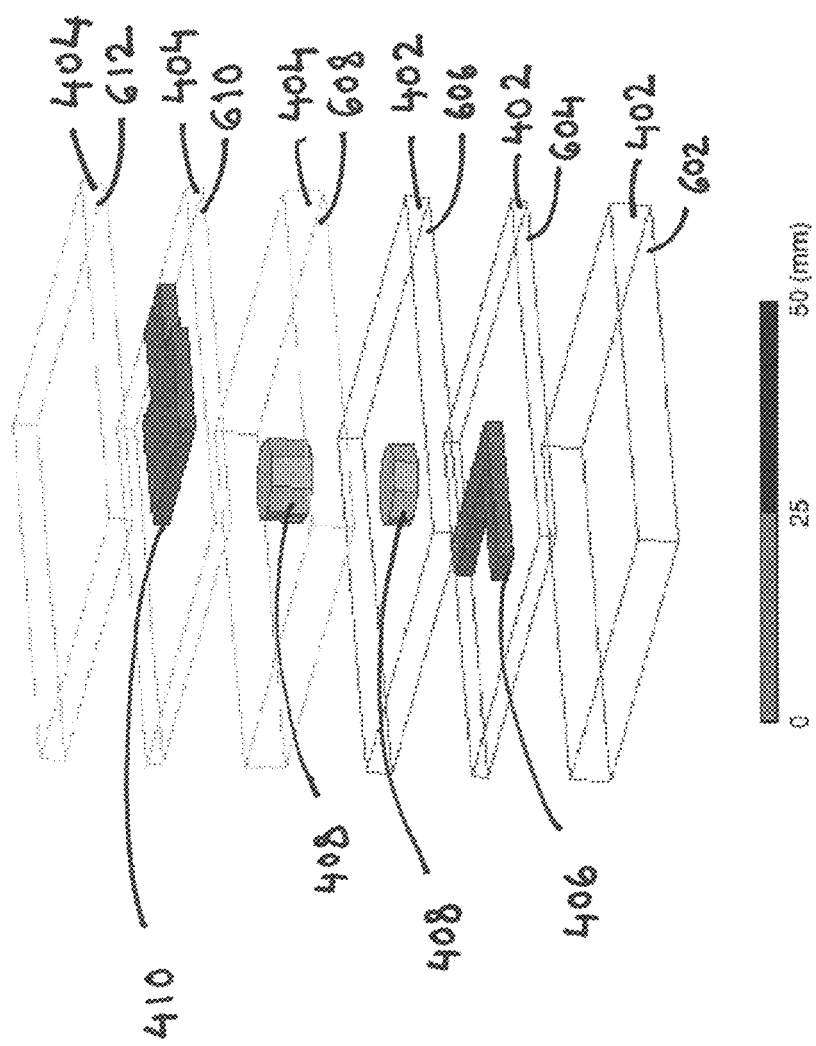
Figure 6C:
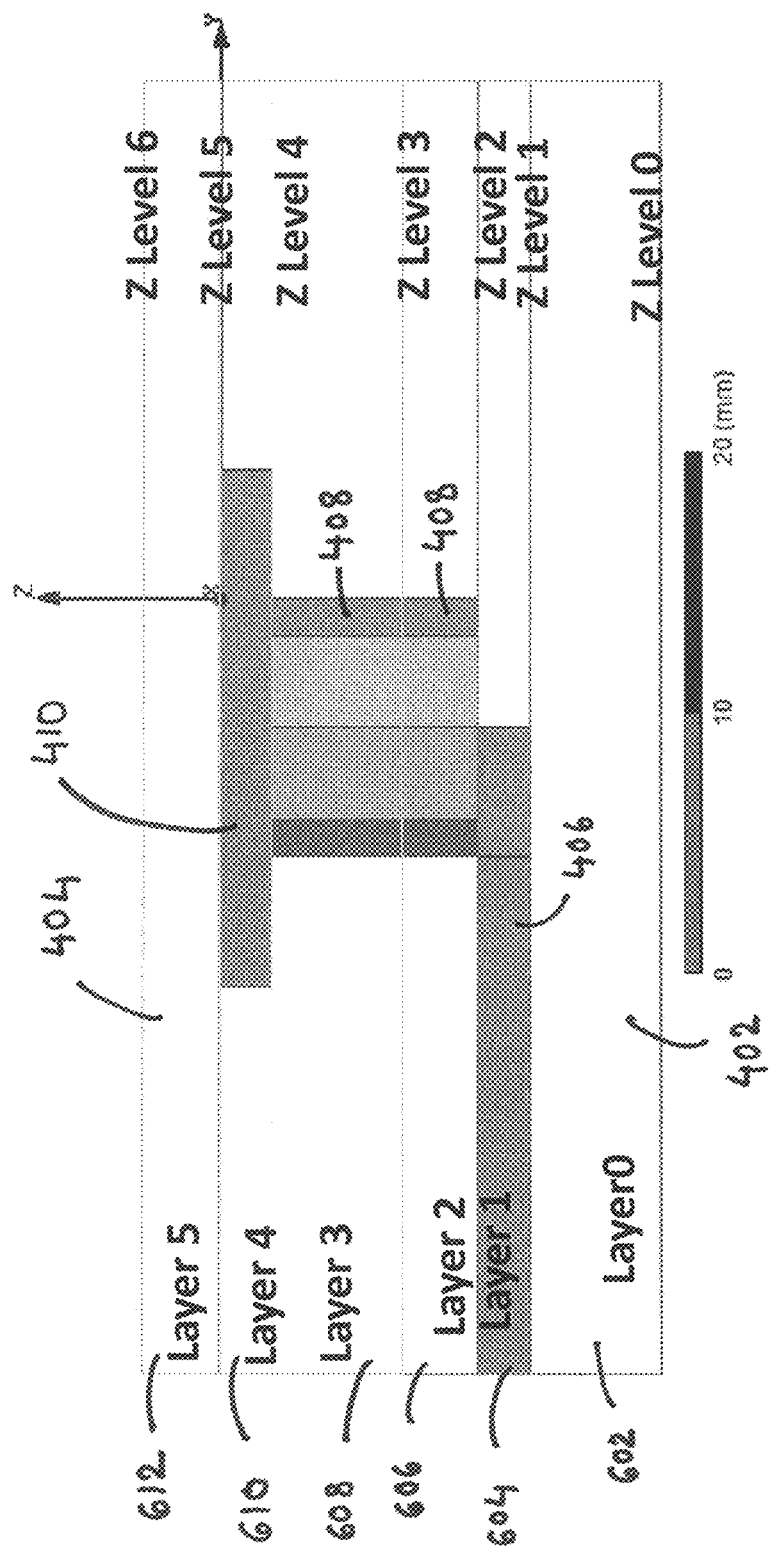
FIG. 6C schematically depicts the layers obtained via the layer decomposition illustrated in FIGS. 6A and 6B.

After receiving a specification of a volumetric object, that object is split into the corresponding individual objects. FIG. 5B depicts the ports 502, 504, the vias 506-512, and the traces 514-520 broken at the material boundaries 522. With reference to FIGS. 6A-6C, each material transition and the associated Z location is identified for the objects described with reference to FIGS. 4A-4E. For example, the water object 402 starts at Z location 0 (depicted as "Z level 0" in FIG. 6C). The water object 402 is split at a lower boundary of the trace_L 406 because the material changes from water to both water and copper, to form two adjacent Z layers, namely "Layer 0" 602 and "Layer 1" 604. The lower boundary of the trace_L 406 corresponds to Z location 1 ("Z Level 1").

The water object 402 is split again at the boundary between the trace_L 406 and the via 408 because the materials change at that boundary. Even if the trace_L 406 and the via 408 were made from the same material (e.g., both were copper objects), a change of shape between these two objects can be recognized, and the water object 402 may still be split at a top boundary of the trace_L 406. Due to the second split, another Z layer, "Layer 2" 606, is formed adjacent to the "Layer 1" 604. The boundary between the trace_L 406 and the via 408 corresponds to Z location 2 ("Z Level 2").

The via 408 is split at Z location 3 ("Z Level 3"), i.e., the boundary between the water object 402 and the air object 404, to form another Z layer ("Layer 3") 608, which is adjacent to "Layer 2" 606. The air object 404 is split at the boundary of the via 408 and the trace_T 408 to form yet another Z layer ("Layer 4") 610. The location of this boundary is Z location 4 ("Z Level 4"). Finally, the air object 404 is split at Z location 5 ("Z Level 5") indicating an upper boundary of the trace_T 410. This split forms a Z layer ("Layer 5") 612, which extends up to the upper boundary of the air object 404 at Z location 6 ("Z Level 6").

Figure 7B:
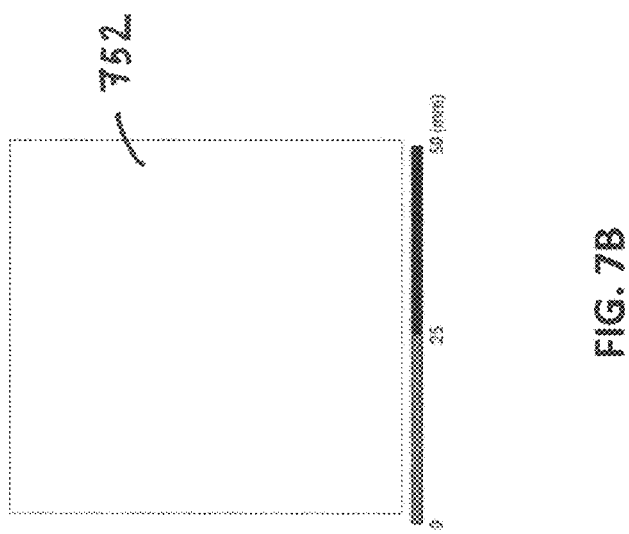
FIGS. 7A-7E illustrate determination of polyhedrons and polygons associated with some of the exemplary objects depicted in FIGS. 4A-4E, and the corresponding layers depicted in FIG. 6C, in accordance with one embodiment of the present invention.
Figure 7A:
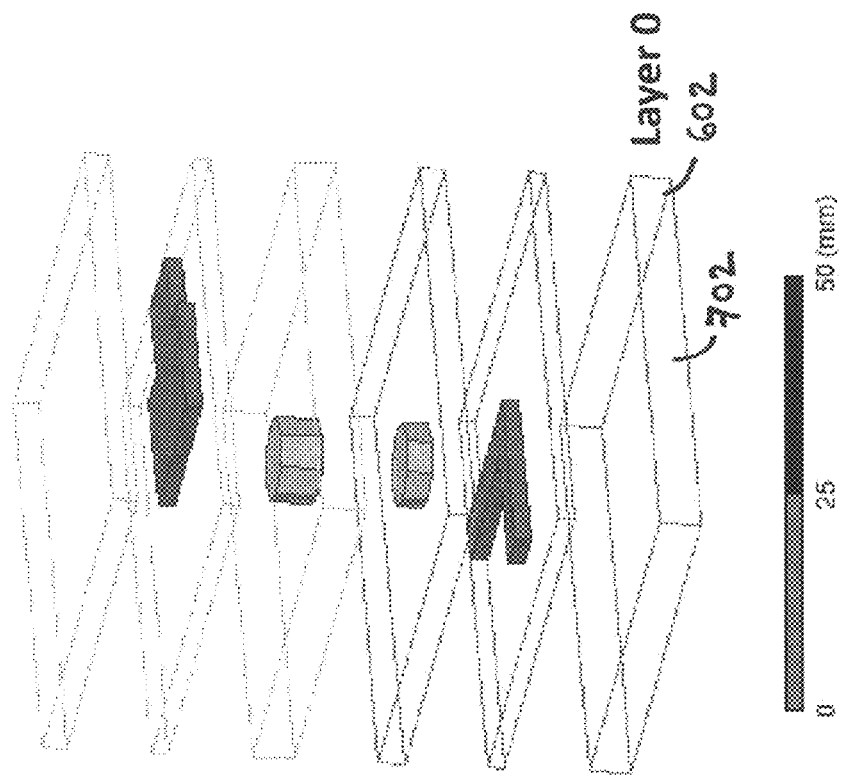
Figure 7D:
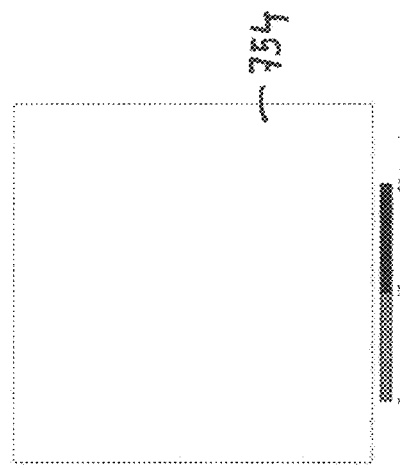
Figure 7E:
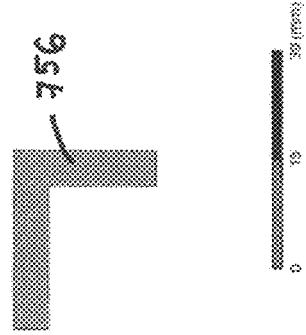
Figure 7C:
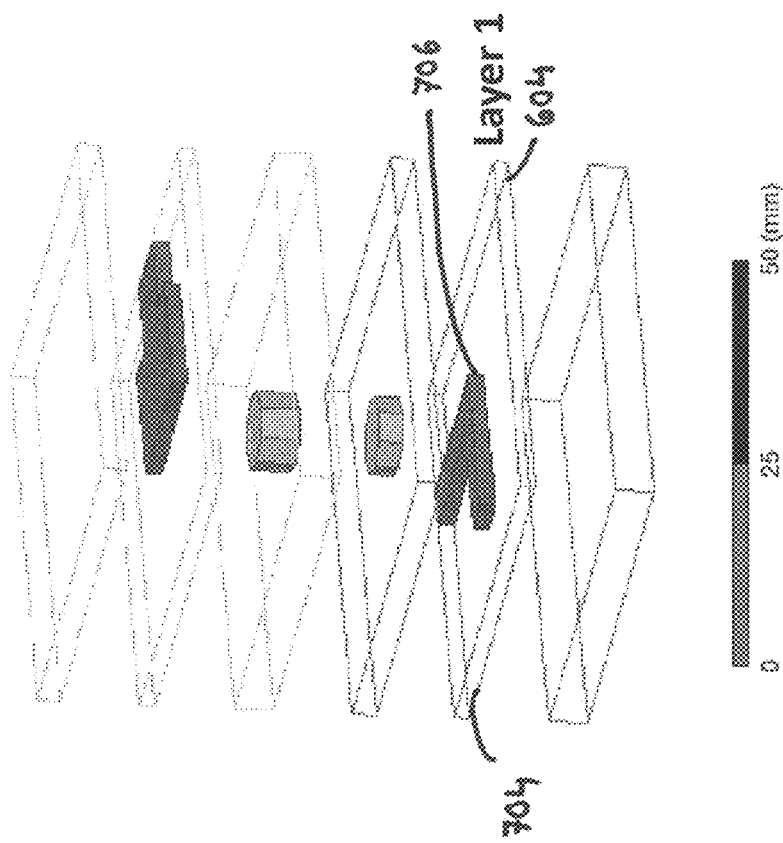

After identifying all the layers in the specified volumetric object, generalized polyhedrons corresponding to each layer are determined, and the generalized polyhedrons are transformed into corresponding convex polyhedrons. To illustrate, with reference to FIGS. 7A-7E, there is a single polyhedron 702 at Layer 0 602 corresponding to a portion of the water object 402 in Layer 0 602. The polygon 752 corresponding to the polyhedron 702 is a rectangle, and as such, the polyhedron 702 is convex. Layer 1 604, however, includes a polyhedron 704 corresponding to a portion of the water object 402 in Layer 1 604 and another polyhedron 706 corresponding to the trace_L 406. The polygon 754 corresponding to the polyhedron 704 is a rectangle, and hence, the polyhedron 704 is convex. On the other hand, the polyhedron 706 is not convex because the polygon 756 corresponding thereto is L shaped, which is not a convex shape. As it can be seen in FIG. 7C, the polyhedrons 704, 706 overlap, and the corresponding polygons 754, 756 overlap as well.

Figure 8A:
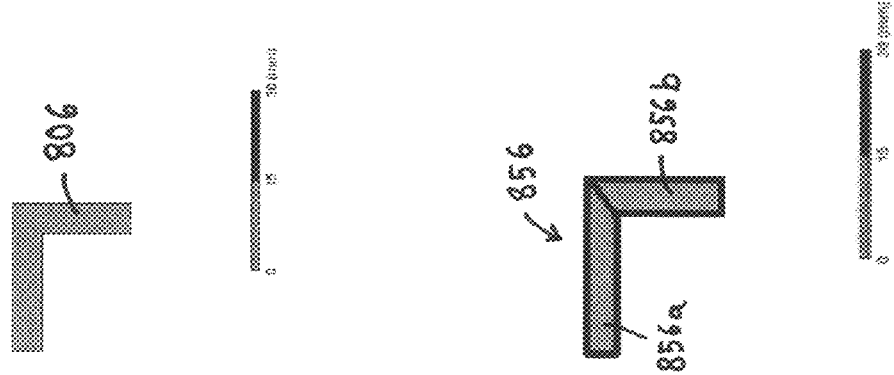
FIGS. 8A and 8B illustrate transformation of generalized polyhedrons described with reference to FIGS. 7A-7E into convex polyhedrons, in accordance with one embodiment of the present invention.
Figure 8A:
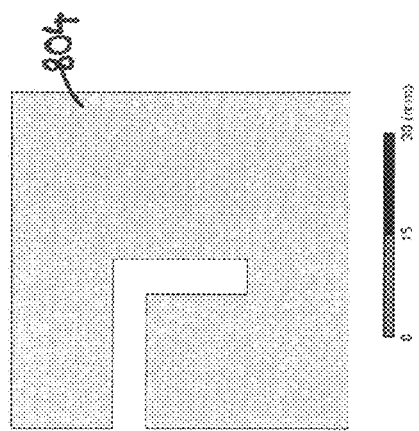
Figure 8B:
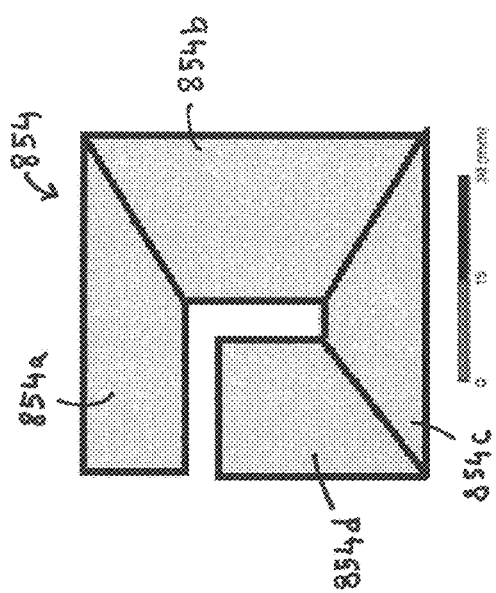

With reference to FIGS. 8A and 8B, the overlapping polygons 754, 756 (depicted in FIGS. 7D and 7E) are converted into corresponding non-overlapping polygons 804, 806. The polygon 806 is L shaped, similar to the polygon 756, and the polygon 804 has the shape of a rectangle with an L-shaped section removed therefrom. Both non-overlapping polygons 804, 806 are concave. The polygon 804 is converted into a set of convex polygons 854, which includes four convex polygons 854a, 854b, 854c, 854d. The polygon 806 is also converted into a set of convex polygons 856, which includes two convex polygons 856a, 856b. The original polygons are unions of these non-overlapping, non-intersecting polygons. Each convex polygon in each set of polygons 854, 856 is swept in the Z direction according to the determined thickness of Layer 1 604, so that a corresponding set of complex polyhedrons is reconstructed.

Figure 9A:
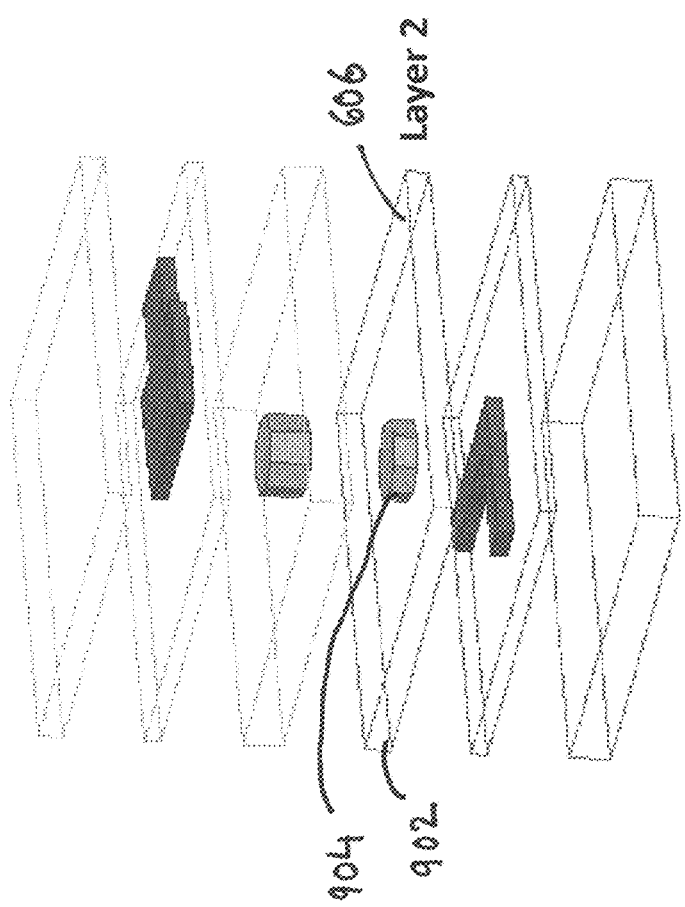
FIGS. 9A and 9B also illustrate determination of polyhedrons and polygons associated with some other exemplary objects depicted in FIGS. 4A-4E, and the corresponding layers depicted in FIG. 6C, in accordance with one embodiment of the present invention.
Figure 9B:
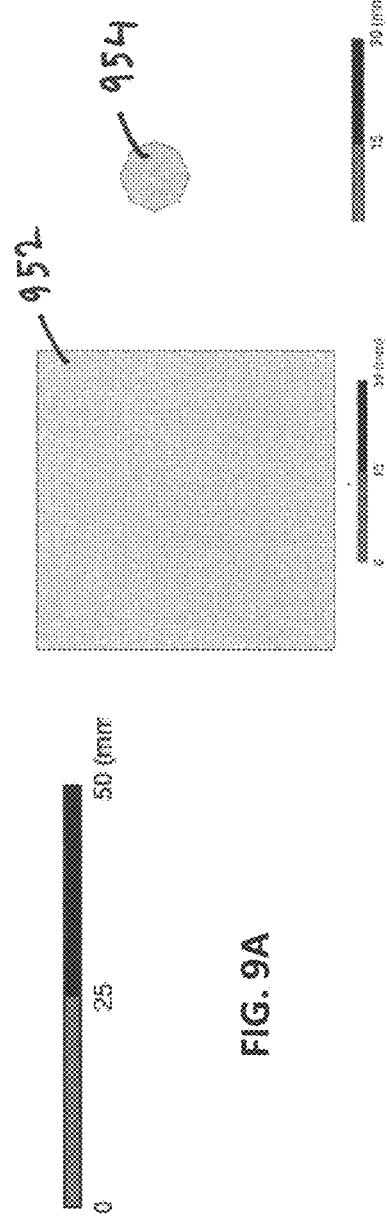

With reference to FIGS. 9A and 9B Layer 2 606 includes a polyhedron 902 corresponding to a portion of the water object 402 in Layer 2 606 and another polyhedron 904 corresponding to a portion of the via 408. The polygon 952 corresponding to the polyhedron 902 is a rectangle, and hence, the polyhedron 902 is convex. The polyhedron 904 corresponds to a polygon 954 which is an octagon and, hence, the polyhedron 904 is also convex. The polyhedrons 902, 904 overlap, however, and the corresponding polygons 952, 954 overlap as well.

Figure 10B:
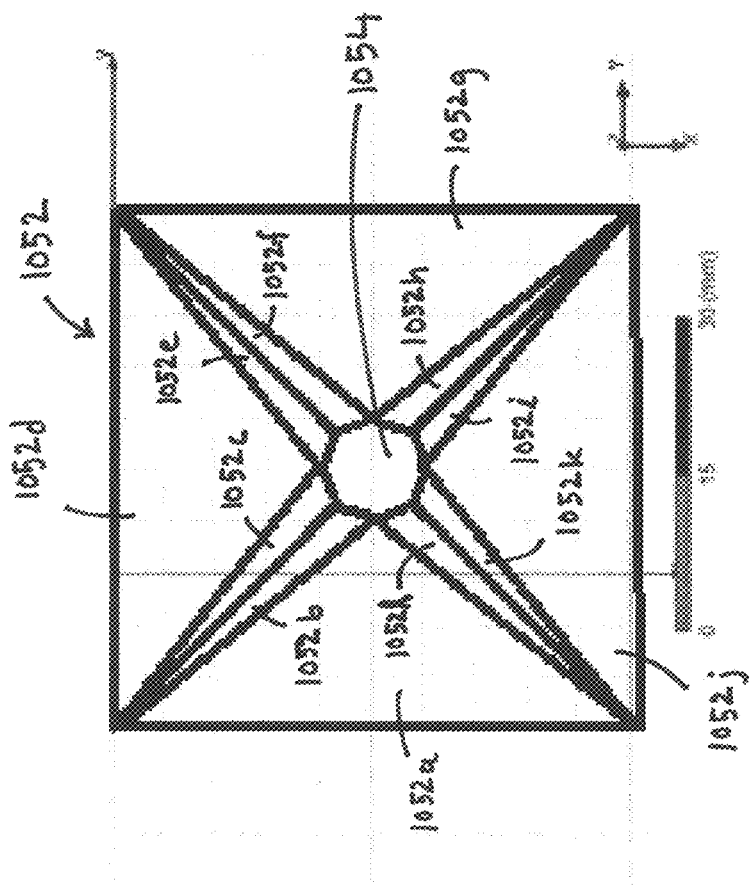
FIGS. 10A and 10B illustrate transformation of generalized polyhedrons described with reference to FIGS. 9A and 9B into convex polyhedrons, in accordance with one embodiment of the present invention.
Figure 10A:
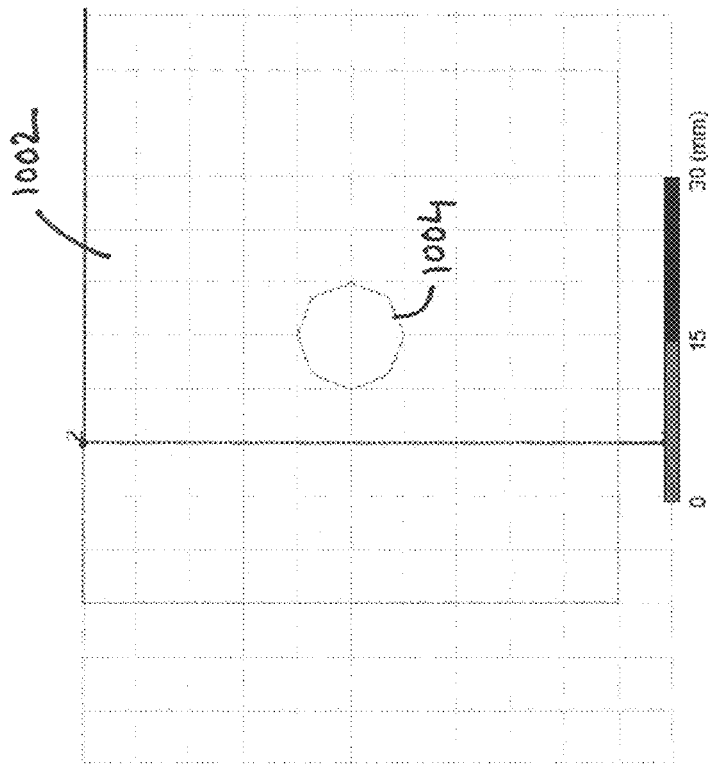

With reference to FIGS. 10A and 10B, the overlapping polygons 952, 954 (depicted in FIG. 9B) are converted into corresponding non-overlapping polygons 1002, 1004. The polygon 1004 is an octagon, similar to the polygon 954, and is convex. Therefore, the corresponding set of convex polygons 1054 includes the polygon 1004 itself. The polygon 1002 has the shape of a rectangle with an octagonal section removed therefrom, and the polygon 1002 is concave. Therefore, the polygon 1002 is converted into a set of convex polygons 1052, which includes twelve convex polygons 1052a through 1052l. In this example, each of the twelve polygons 1052a through 1052l is a triangle. In general, however, some or all of the convex polygons in a set of convex polygons can be polygons other than triangles. Each convex polygon in each set of polygons 1052, 1054 is swept in the Z direction according to the determined thickness of Layer 2 606, so that a corresponding set of complex polyhedrons is reconstructed.

While the Z direction discussed above is a vector, i.e., sweeping occurs in a single direction, the sweep path in general can be curved. A piecewise linear curve is constructed to approximate a curved sweep path, which may include even a twist. Each linear segment is processed as a single layer, as described above. A geometric transformation of the geometries associated with a layer (i.e., polygons and polyhedrons) can account for a twist. The above described layer splitting and generation and transformation of polyhedrons is applicable as long as a collection of all of the sweep paths of all of the cross sections are aligned. The sweep paths can be considered as aligned if all of the sweep paths of all of the cross sections can be made to coincide with one other by applying translation coordinate transformations.

It should also be understood that in general, any layer may include more than two generalized polyhedrons, some of which may overlap each other or may intersect with each other. The transformation of the polygons corresponding to the generalized polyhedrons into non-overlapping and non-intersection polygons may result into more than two polygons, some or all of which may be concave. The conversion of each concave polygon into a corresponding set of convex polygons can result in including two or more convex polygons in each set. A reconstruction of these convex polygons can provide a set of convex polyhedrons representing the layer.

Figure 11B:
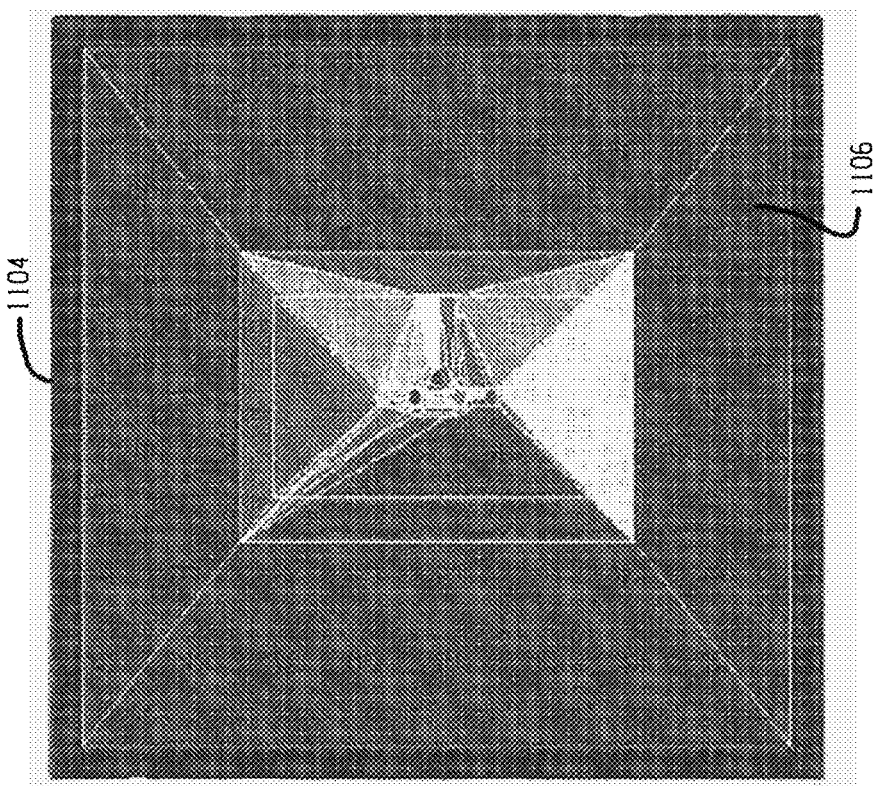
FIGS. 11A and 11B schematically depict generalized polyhedrons associated with a representative layer including several volumetric objects.
Figure 11A:
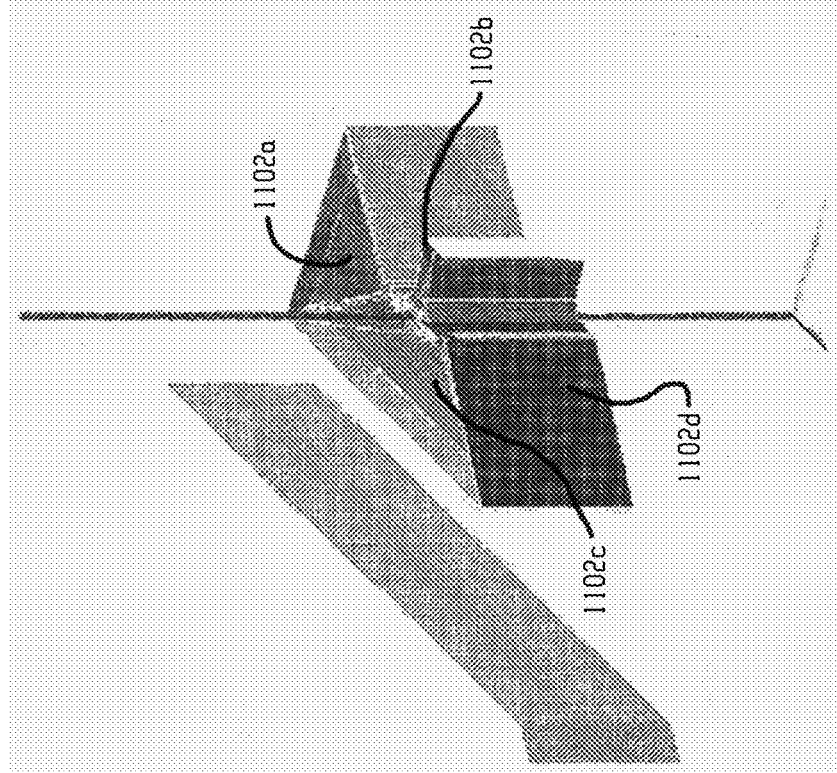
Figure 11D:
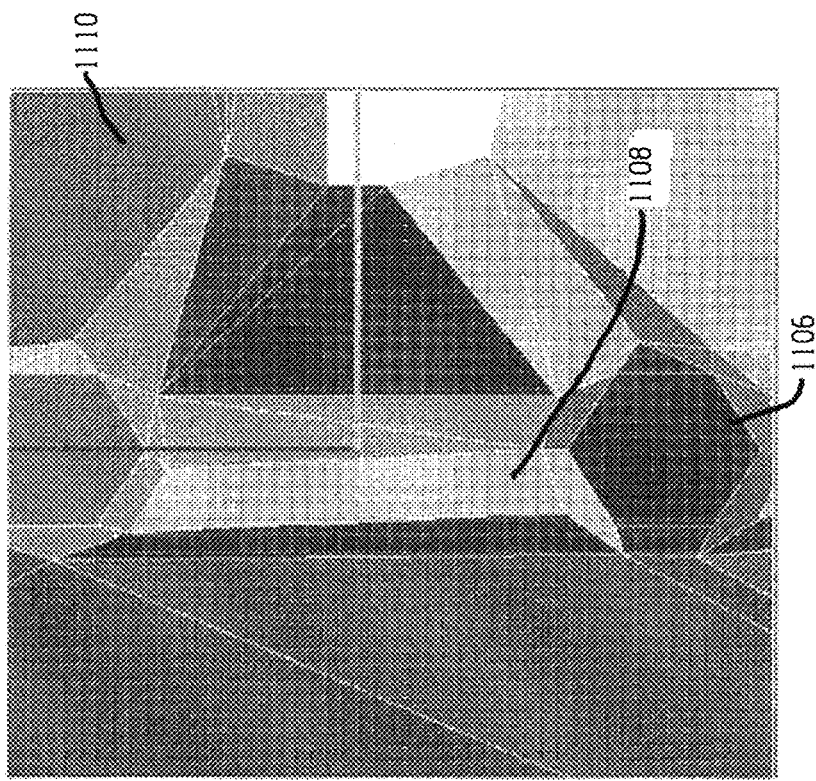
FIG. 11D is a zoomed view of the top view depicted in FIG. 11C.
Figure 11C:
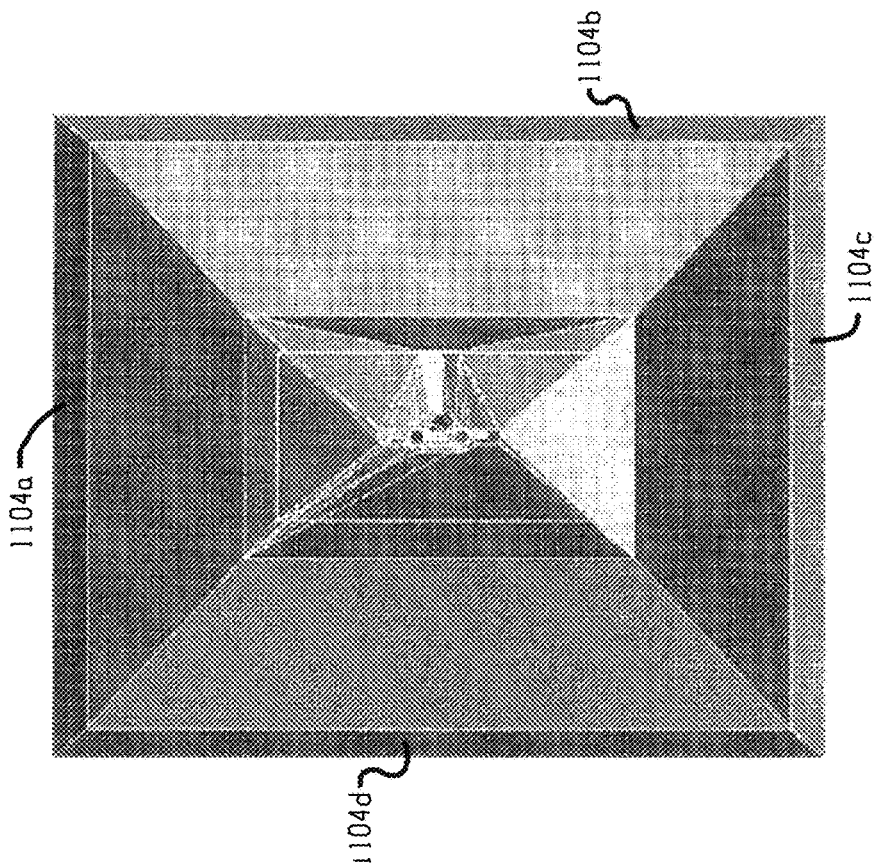
FIG. 11C depicts a top view of the convex polyhedrons corresponding to the generalized polyhedrons depicted in FIGS. 11A and 11B.

For example, with reference to FIGS. 11A and 11B, a representative layer of a representative structure includes some intersecting and/or overlapping polyhedrons 1102a-1102d. In a top view of all of the polyhedrons of the representative layer, seen as polygons, the polyhedrons 1104, 1106 are concave because they contain holes. Many interior polyhedrons may also be concave. FIG. 11C shows that after enforcing the convexity conditions, as described above, the concave polyhedron 1104 corresponds to a set of convex polyhedrons 1104a-1104d. FIG. 11D depicts various other convex polyhedrons 1106, 1108, 1110 corresponding to the representative layer.

In general, the transformation of generalized polyhedrons into convex polyhedrons can be done for each layer independently of the transformations in the adjacent layers. As such, the resulting convex polyhedrons may not be continuous, i.e., a mesh of the convex polyhedrons from adjacent layers may include hanging nodes and hanging edges.

Figure 12A:
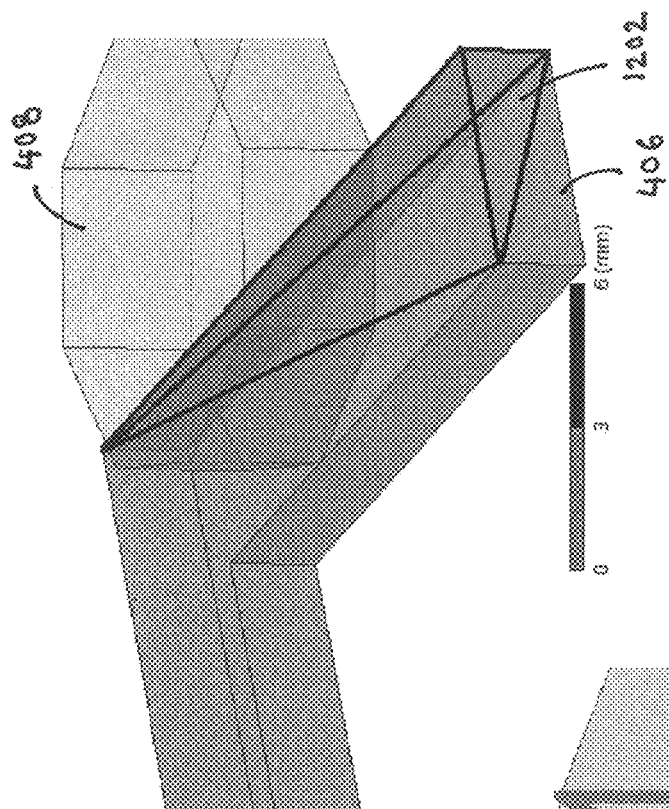
FIGS. 12A and 12B schematically depict conversion of convex polyhedrons into overlapping and/or intersecting tetrahedrons, in accordance with one embodiment of the present invention.
Figure 12B:
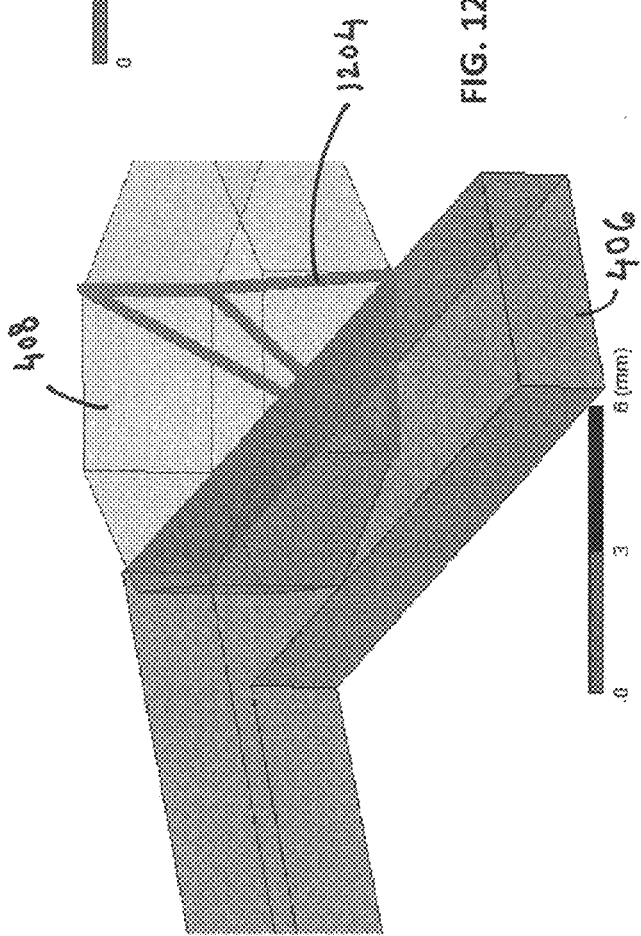

In one embodiment, after reconstructing a set of convex polyhedrons corresponding to a layer of a volumetric solid, as described above, the convex polyhedrons in that set are converted into a set of tetrahedrons corresponding to that layer. The conversion process is repeated for each layer. In the alternative, a set of convex polyhedrons is reconstructed for a group of two or more layers or even all of the layers, and then the convex polyhedrons in the sets corresponding to the layers in the group or all of the layers are converted into corresponding sets of tetrahedrons. If the tetrahedrons in the sets corresponding to a pair of adjacent layers overlap or intersect, a mesh of these tetrahedrons is not continuous. For example, with reference to FIGS. 12A and 12B, a tetrahedron 1202 corresponding to Layer 1 604 and associated with the trace_L 406 intersects with the tetrahedron 1204 corresponding to Layer 2 604 and associated with the via 408. As such, a mesh that includes the tetrahedrons 1202, 1204 is not continuous.

Therefore, after converting the convex polyhedrons corresponding to two or more layers into sets of corresponding tetrahedrons, one or more tetrahedrons in these sets may be modified or replaced with one or more different tetrahedrons, so as to make the mesh of tetrahedrons continuous, i.e., no tetrahedrons in the mesh overlap or intersect. This post-conversion enforcement of continuity can be inefficient, as it can increase the processing time and/or processing resources requirements (e.g., the number of processors needed, memory size, etc.) in some instances.

In order to generate efficiently a continuous mesh, in some embodiments, after reconstructing sets of convex polyhedrons corresponding to a pair of adjacent layers of a volumetric solid, as described above, the convex polyhedrons in each set are converted into a corresponding set of tetrahedrons by taking into account the convex polyhedrons in the other set, corresponding to the adjacent layer. To illustrate, with reference to FIG. 13A, convex polyhedrons 1302, 1304 correspond to the trace_L 406 and to Layer 1 604. A convex polyhedron 1306 corresponds to the via 408 and to the adjacent layer, i.e., Layer 2 606. The polyhedron 1302 is decomposed into corresponding tetrahedrons 1352, 1354, without accounting for the polyhedron 1306. Therefore, after decomposing the polyhedron 1306 into the corresponding tetrahedrons, a non-continuous mesh will form.

With reference to FIGS. 13A and 13B, the edges 1312, 1314, 1316, 1318 of the polyhedron 1306 are imprinted on the polyhedron 1302. These edges are selected because the polyhedrons 1302, 1306 correspond to adjacent layers (i.e., Layer 1 604 and Layer 2 606), and the selected edges of the polyhedron 1306 overlap with the polyhedron 1302. While decomposing the polyhedron 1306 into a set of tetrahedrons, the imprinted edges 1312 through 1318 are taken into account, and tetrahedrons are determined such that the set of tetrahedrons includes each one of the edges 1312 through 1318. Specifically, the polyhedron 1302 is decomposed into tetrahedrons 1360, 1362, 1364, 1366, 1368, 1370, 1372, 1374, 1376. The tetrahedrons 1362, 1366 include the edge 1312; the tetrahedrons 1364, 1366 include the edge 1314; tetrahedrons 1368, 1372 include the edge 1316; and tetrahedrons 1370, 1374 include the edge 1318.

Figure 13C:
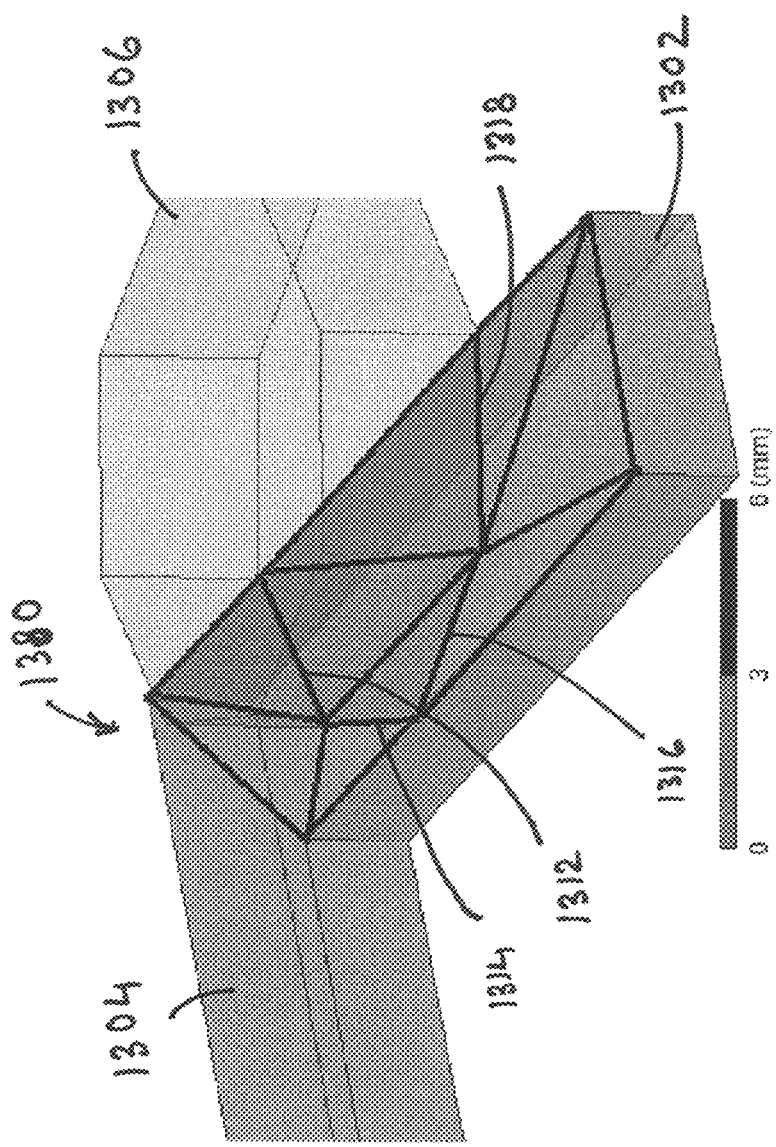
Figure 14:
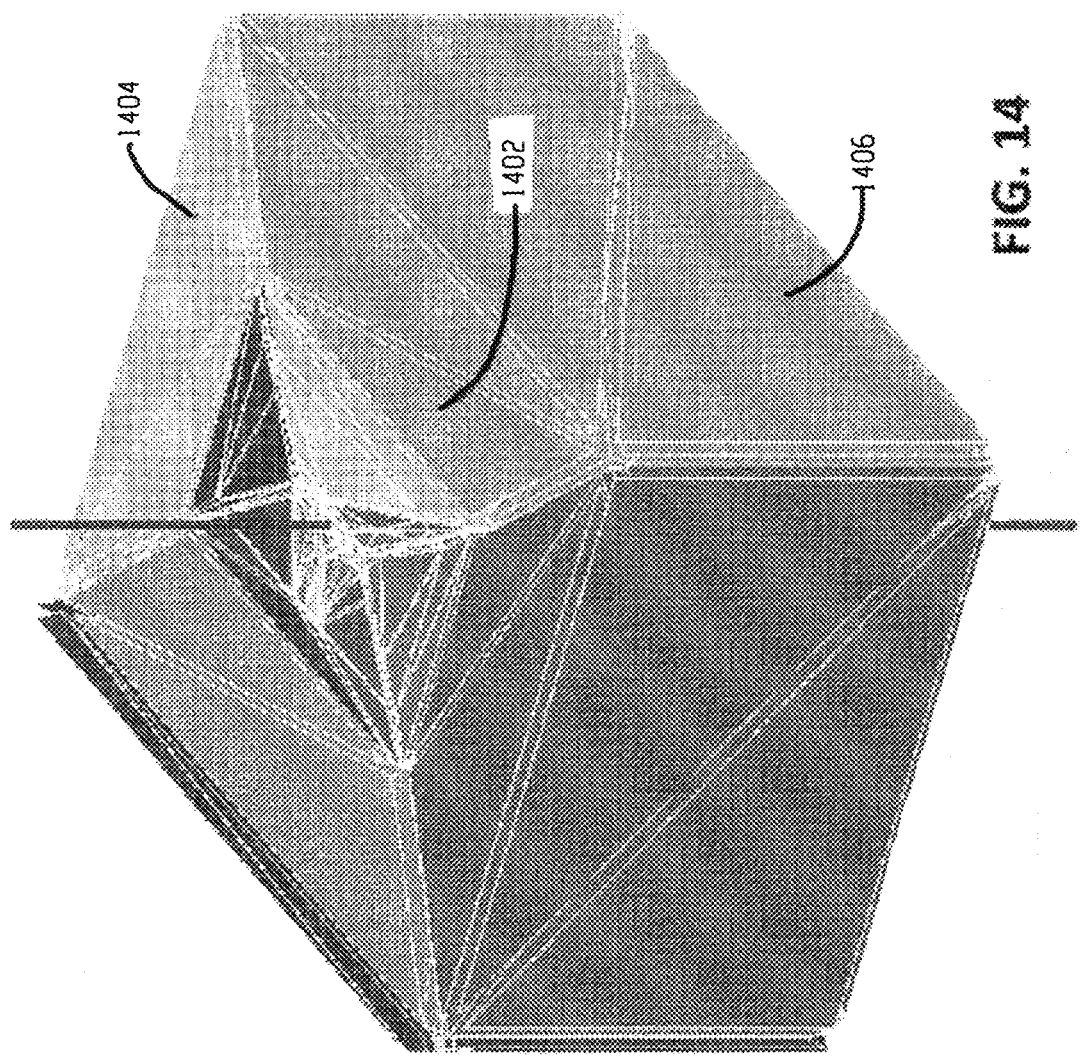
FIG. 14 schematically depicts conversion of convex polyhedrons illustrated with reference to FIGS. 11A-11D into non-overlapping and non-intersecting tetrahedrons, in accordance with various embodiments of the present invention.

While decomposing the polyhedron 1306 corresponding to Layer 2 606, the intersecting edge 1322 of the polygon 1302 corresponding to the adjacent layer (Layer 1 604) is similarly taken into account. As such, the tetrahedrons 1360 through 1376 and the tetrahedrons corresponding to the polyhedron 1306 do not have any intersecting or overlapping edges, and such decomposition automatically produces a continuous mesh, without having to enforce any continuity requirements after tetrahedron generation. FIG. 13C illustrates a different decomposition of the polyhedron 1302 in which the set of tetrahedrons 1380 includes each of the overlapping edges 1312 through 1318 of the polyhedron 1306, resulting in a continuous mesh. For the representative layer of the representative structure illustrated with reference to FIGS. 11A-11C, a final tetrahedral decomposition of the representative layer, performed as described above, produced various tetrahedrons 1402, 1404, 1406, as depicted in FIG. 14.

Figure 15A:
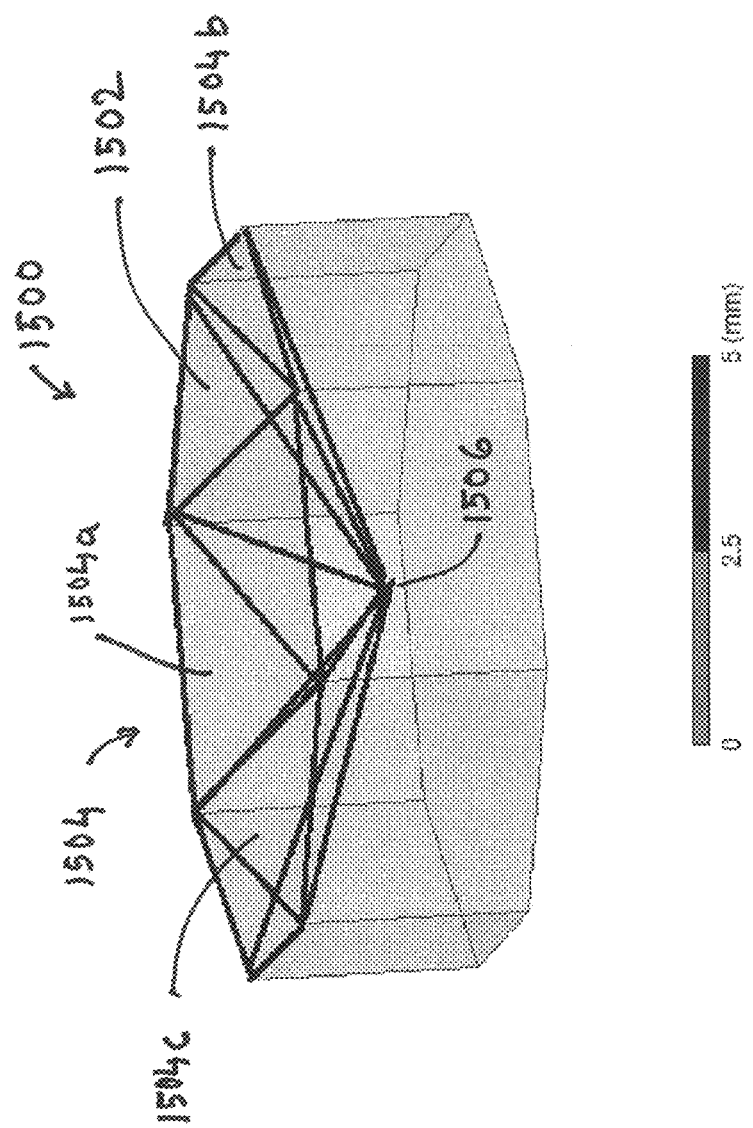
FIGS. 15A-15C illustrate internal point tetrahedron decomposition, in accordance with various embodiments of the present invention.

In some embodiments, the decomposition of a convex polyhedron into a set of tetrahedrons, whether using imprints of an adjacent polyhedron or otherwise, is performed by decomposing the convex polyhedrons into triangular prisms, and then decomposing each prism into three tetrahedrons. In other embodiments, the decomposition of a convex polyhedron is performed using a point internal to the polyhedron. With reference to FIG. 15A, a top face 1502 of an octagonal polyhedron 1500 is triangulated, i.e., partitioned into a set of triangles 1504. The set 1504 includes, for example, triangles 1504a, 1504b, and 1504c, and some additional triangles as well. Each vertex of each triangle in the set 1504 is connected to the centroid 1506 of the polyhedron 1500, generating a set of tetrahedrons.

Figure 15C:
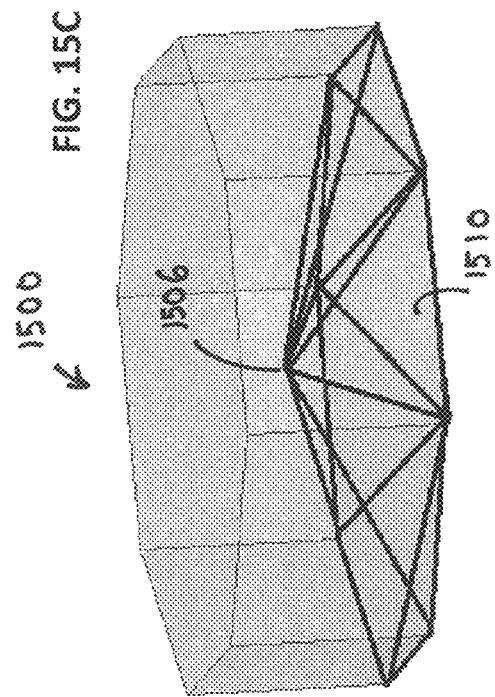
Figure 15B:
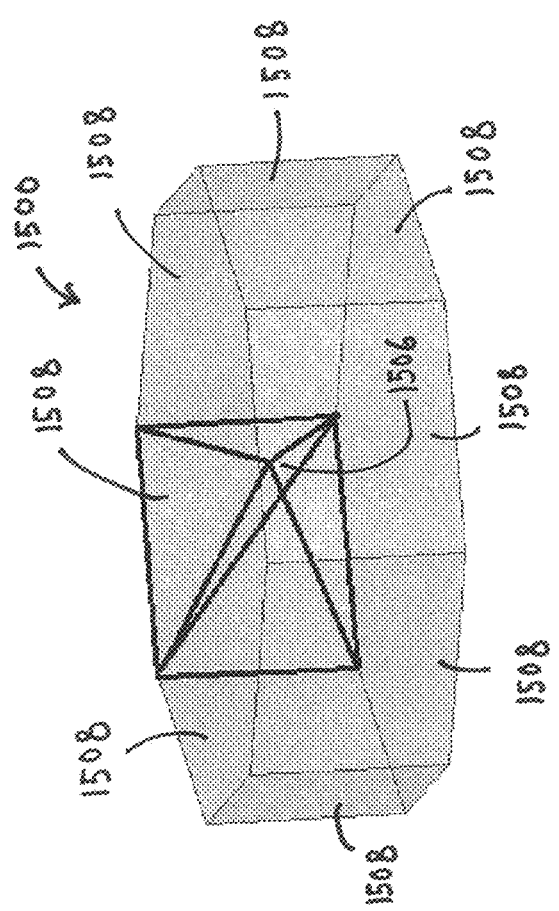

With reference to FIG. 15B, each face 1508 of the polyhedron 1500 is similarly triangulated, and each vertex of each of the resulting triangles is also connected to the centroid 1506, adding several new tetrahedrons to the set of tetrahedrons. With reference to FIG. 15C, the bottom face 1510 of the polyhedron 1500 is also triangulated, and each vertex of each of the resulting triangles is connected to the centroid 1506, adding several more tetrahedrons to the set of tetrahedrons. In some embodiments, instead of using the centroid 1506, a different point that is inside the polyhedron 1500 may be used in generating the set of tetrahedrons.

Figure 15D:
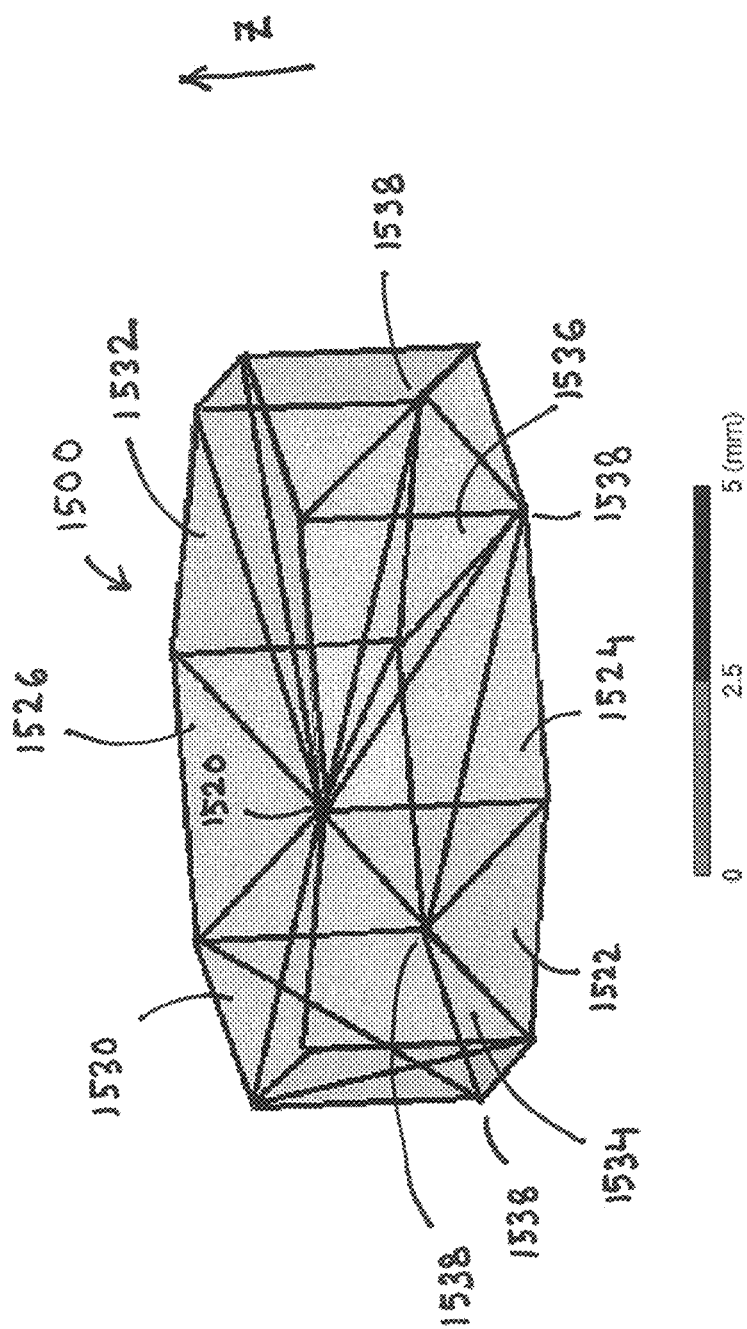
FIG. 15D illustrates surface vertex tetrahedron decomposition, in accordance with various embodiments of the present invention.

In surface vertex decomposition, with reference to FIG. 15D, each vertex of a polyhedron, e.g., the vertex 1520 of the polyhedron 1500, has associated therewith two vertical faces, i.e., faces substantially parallel to the Z direction, and one horizontal face, i.e., a face to which the Z direction is normal. For example, the vertex 1520 is associated with two vertical faces 1522, 1524, and a horizontal face 1526. Any selected vertex (e.g., the vertex 1520), is used in all of the triangles formed in triangulating the faces associated with the selected vertex. For example, triangles 1530, 1532 of the horizontal face 1526, and a triangle 1534 of the vertical face 1522 and a triangle 1536 of the vertical face 1524 are formed using the vertex 1520. After forming a set of triangles, each of which includes the selected vertex, the selected vertex is connected to each of the other vertices (e.g., vertices 1538) of the polyhedron to provide a set of tetrahedrons. In some embodiments, any of the internal point and surface vertex decompositions accounts for one or more polyhedrons in an adjacent layer, by imprinting and including in the set of tetrahedrons the intersecting and/or overlapping edges of the one or more polyhedrons in the adjacent layer, automatically forming a continuous mesh of tetrahedrons, without having to enforce any continuity requirements after tetrahedron generation.

Figure 16:
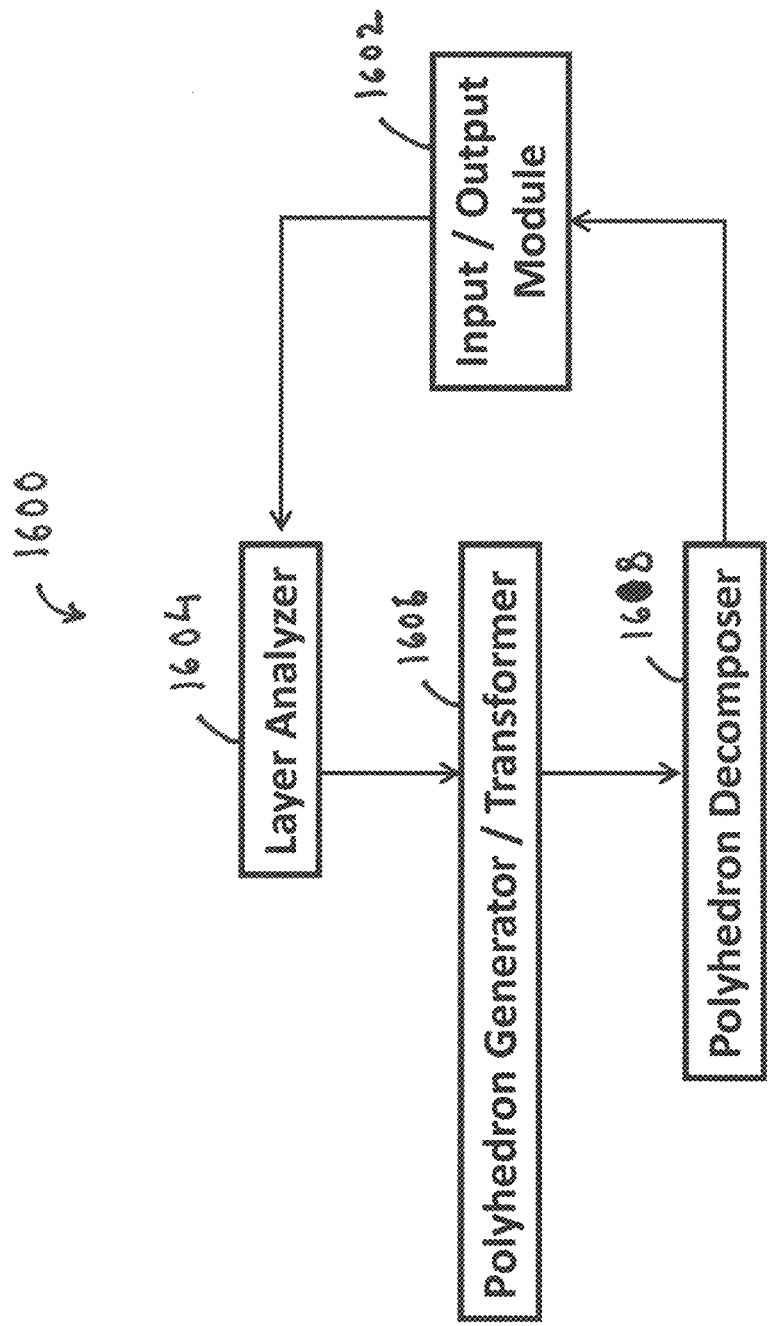
FIG. 16 illustrates a system for generating a continuous tetrahedral mesh, in accordance with various embodiments of the present invention.

With reference to FIG. 16, a system 1600 for generating a continuous mesh includes an input/output module 1602 adapted to receive a specification of volumetric objects. A layer analyzer 1604 splits the objects into the corresponding layers, and the polyhedron generator/transformer 1606 generates generalized polyhedrons for each layer. Using prismatic properties of the received objects, the polyhedron generator/transformer 1606 transforms the generalized polyhedrons into convex polyhedrons. For each identified layer, the polyhedron decomposer 1608 converts the convex polyhedrons into tetrahedrons by taking into consideration the edges of one or more polyhedrons in one or both adjacent layers, so as to automatically generate, i.e., without having to enforce any continuity requirements after tetrahedron generation, a tetrahedral mesh that is continuous. The continuous tetrahedral mesh can be supplied via the input/output module 1602 to other analyzers used for analyzing the physical properties of the structure represented by the continuous mesh.

In various embodiments, one or more of the modules 1602-1608 are implemented as software modules, hardware modules, or a combination thereof. Each software module may be designated to a distinct, dedicated processor and associated memory, the processors being coupled using a communication network. Alternatively, a single processor may execute more than one modules in some embodiments and all four modules in one embodiment, using distributed or shared memories. In some embodiments, the input/output functionalities are provided by two distinct modules.

According to various embodiments of the method 300 (described with reference to FIG. 3) and embodiments of the system 1600, generation of polyhedrons takes advantage of the fact that the received objects have a layered structure and are prismatic. Moreover, decomposition of polyhedrons into tetrahedrons in these embodiments does not require any post processing to enforce continuity. Therefore, systems and methods according to these embodiments can significantly improve the speed and/or efficiency of generating a continuous tetrahedral mesh.

Figure 17:
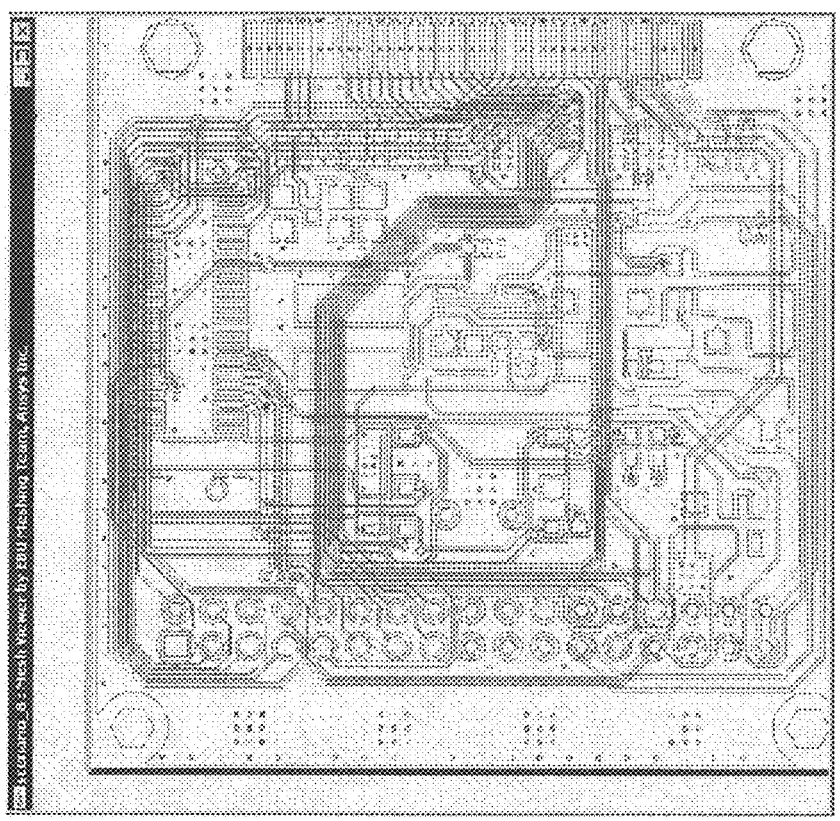
FIG. 17 an exemplary circuit layout for which a continuous tetrahedral mesh can be generated, in accordance with various embodiments of the present invention.

For example, after running for over ten hours a conventional mesh generator did not produce a continuous mesh for an exemplary circuit layout 1700 depicted in FIG. 17. The circuit layout 1700 includes about 500 objects and five Z levels. An embodiment of the system 1600 generates a continuous mesh of about 223,000 tetrahedrons in less than a minute and a half. For another structure that includes about 1000 objects and about 100 Z levels, a conventional mesher did not produce a mesh, while an embodiment according to the system 1600 generated a mesh of over 2.5 million tetrahedrons in less than 25 minutes.

Even if a conventional mesher can produce a continuous mesh, embodiments of the system 1600 can provide a significant improvement in processing speed and/or reduction in the complexity of the produced mesh, e.g., in terms of the total number of tetrahedrons in the mesh. To illustrate, for one circuit layout including about 6,200 objects and 21 Z levels, a conventional mesher produced a mesh of about 2.3 million tetrahedrons after running for more than eight hours. In contrast, a mesher according to the system 1600 produced a continuous mesh of about 1.8 million tetrahedrons in less than 20 minutes, providing over 30 times speed up.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, I claim:

1. A method of facilitating generation of a mesh corresponding to a volumetric object to facilitate analysis of response of the volumetric object to a physical condition, the method comprising:
    identifying by a processor coupled to a memory, a plurality of layers of a volumetric object comprising a plurality of different materials and a plurality of individual objects, a boundary of each layer representing at least one of: a change in material and a change in a shape of an individual object;
    transforming by the processor, first, second, and third generalized polyhedron stored in the memory and representing at least a portion of first, second, and third layers, respectively, of the volumetric object into first, second, and third sets of convex polyhedrons, by:
        representing the first, second, and third generalized polyhedrons as first, second, and third polygons;
        decomposing each of the first, second, and third polygons into a corresponding first, second, and third set of convex polygons; and
        reconstructing the first, second, and third sets of convex polyhedrons from each respective set of convex polygons by sweeping each convex polygon in the respective set of convex polygons in a Z direction, wherein a length of the sweep corresponds to a thickness of the respective layer;
    selecting a convex polyhedron in the first set of convex polyhedrons;
    imprinting an edge of a convex polyhedron of the second set of convex polyhedrons onto the selected convex polyhedron; and
    constructing at least two tetrahedrons corresponding to the selected convex polyhedron, each of the at least two tetrahedrons comprising the imprinted edge, and the first set of tetrahedrons comprising the at least two tetrahedrons, thereby forming automatically, without having to enforce any continuity requirements after tetrahedron generation, a mesh of tetrahedrons that is continuous with a second set of tetrahedrons corresponding to the second set of convex polyhedrons;
    wherein the second layer is adjacent to both the first and third layers, the first layer is not adjacent to the third layer, and no edges of convex polyhedrons of the third set of convex polyhedrons are imprinted onto the convex polyhedrons of the first set of polyhedrons for constructing tetrahedrons.

2. The method of claim 1, wherein the volumetric object comprises at least one of a solid, a liquid, and a gas.

3. The method of claim 1, further comprising:
    selecting another, different convex polyhedron in the first set of convex polyhedrons; and repeating the constructing step for the selected other convex polyhedron.

4. The method of claim 1, wherein constructing the selected polyhedron into the first set of tetrahedrons comprises at least one of interior point decomposition and surface vertex decomposition.

5. The method of claim 1, further comprising:
    selecting a convex polyhedron in the second set of convex polyhedrons; and
    forming a continuous mesh of tetrahedrons comprising the first and second sets of tetrahedrons by converting, based on at least in part an adjacent convex polyhedron in the first set of convex polyhedrons, the selected polyhedron in the second set into a second set of tetrahedrons, the converting step comprising:
    imprinting an edge of the adjacent convex polyhedron in the first set onto the selected convex polyhedron.

6. The method of claim 1, further comprising:
    receiving in the memory a specification of the volumetric object;
    identifying by the processor, the first layer of the volumetric object, the first layer corresponding to a first Z co-ordinate; and
    generating by the processor a layer representation of the first layer, the layer representation comprising the first generalized polyhedron.

7. The method of claim 6, wherein generating the layer representation comprises:
    deriving a set of polygons corresponding to a cross-section of the first layer at a Z location;
    modifying at least one of the polygons in the set by removing at least one of an overlap between two polygons in the set and an intersection of two polygons in the set, to obtain a non-overlapping, non-intersecting set of polygons; and
    sweeping each polygon in the non-overlapping, non-intersecting set of polygons in a Z direction, to obtain the layer representation comprising the first generalized polygon.

8. The method of claim 6, wherein the received specification comprises at least one of a specification of circuitry, a specification of a cable system, and a specification of a fluidic conduit system.

9. The method of claim 6, wherein the received specification is specified using a format comprising at least one of: a set of surface triangles, IGES, STEP, STL, a geometry exchange format comprising ACIS, CATIA, and SDRC, and an electronic CAD (ECAD) system database comprising GDS-II, ODB++, the OpenAccess database, Cadence Allegro, Mentor Expedition, Mentor PADS, Mentor Boardstation, Zuken CR-5000, and Zuken CR-8000.

10. The method of claim 6, further comprising determining if the received specification represents a prismatic volumetric object by:
selecting a Z direction;
obtaining a first cross-section of a volumetric object in the specification in a first plane having a normal in the selected Z direction;
obtaining a second cross-section of the volumetric object in a second, different plane parallel to the first plane; and
identifying the volumetric object as prismatic if the first and second cross-sections are identical.

11. The method of claim 1, wherein the volumetric object corresponds to circuitry comprising:
at least one conducting layer;
at least one dielectric layer; and
at least one of a via, a trace, and a port.

12. The method claim 1, wherein decomposing the polygon into a corresponding set of convex polygons further comprises:
decomposing the polygon into an intermediate set of convex polygons and non-convex polygons; and
performing a conversion operation to convert the non-convex polygons into convex polygons.

13. A system for facilitating generation of a mesh corresponding to a volumetric object to facilitate analysis of response of the volumetric object to a physical condition, comprising:
a polyhedron generator and transformer, the polyhedron generator and transformer being adapted to perform steps including:
identifying by a processor coupled to a memory, a plurality of layers of a volumetric object comprising a plurality of different materials and a plurality of individual objects, a boundary of each layer representing at least one of: a change in material and a change in a shape of an individual object;
transforming by the processor, first, second, and third generalized polyhedron stored in the memory and representing at least a portion of first, second, and third layers, respectively, of the volumetric object into first, second, and third sets of convex polyhedrons, by:
representing the first, second, and third generalized polyhedrons as first, second, and third polygons;
decomposing each of the first, second, and third polygons into a corresponding first, second, and third set of convex polygons; and
reconstructing the first, second, and third sets of convex polyhedrons from each respective set of convex polygons by sweeping each convex polygon in the respective set of convex polygons in a Z direction, wherein a length of the sweep corresponds to a thickness of the respective layer;
selecting a convex polyhedron in the first set of convex polyhedrons;
imprinting an edge of a convex polyhedron of the second set of convex polyhedrons onto the selected convex polyhedron; and
constructing at least two tetrahedrons corresponding to the selected convex polyhedron, each of the at least two tetrahedrons comprising the imprinted edge, and the first set of tetrahedrons comprising the at least two tetrahedrons, thereby forming automatically, without having to enforce any continuity requirements after tetrahedron generation, a mesh of tetrahedrons that is continuous with a second set of tetrahedrons corresponding to the second set of convex polyhedrons;
wherein the second layer is adjacent to both the first and third layers, the first layer is not adjacent to the third layer, and no edges of convex polyhedrons of the third set of convex polyhedrons are imprinted onto the convex polyhedrons of the first set of polyhedrons for constructing tetrahedrons.

14. The system of claim 13, further comprising:
an input-output module adapted to receive and store in the memory a specification of the volumetric object; and
a layer analyzer adapted to:
identify the first layer of the volumetric object, the first layer corresponding to a first Z co-ordinate;
derive a set of polygons corresponding to a cross-section of the first layer at a Z location;
remove from at least one of the polygons in the set at least one of: (i) an overlap between two polygons in the set, and (ii) an intersection of two polygons in the set, to obtain a non-overlapping, non-intersecting modified set of polygons;
sweep each polygon in the modified set of polygons in a Z direction, to obtain a layer representation of the first layer, the layer representation comprising the first generalized polygon; and
store the first generalized polyhedron in the memory.

15. An article of manufacture including a non-transitory machine-readable medium storing instructions that, when executed by a machine comprising a memory and a processor in electronic communication with the memory, configure the processor, for facilitating generation of a mesh corresponding to a volumetric object, further facilitating analysis of response of the volumetric object to a physical condition by performing steps including:
identifying by a processor coupled to a memory, a plurality of layers of a volumetric object comprising a plurality of different materials and a plurality of individual objects, a boundary of each layer representing at least one of: a change in material and a change in a shape of an individual object;
transforming by the processor, first, second, and third generalized polyhedron stored in the memory and representing at least a portion of first, second, and third layers, respectively, of the volumetric object into first, second, and third sets of convex polyhedrons, by:
representing the first, second, and third generalized polyhedrons as first, second, and third polygons;
decomposing each of the first, second, and third polygons into a corresponding first, second, and third set of convex polygons; and
reconstructing the first, second, and third sets of convex polyhedrons from each respective set of convex polygons by sweeping each convex polygon in the respective set of convex polygons in a Z direction, wherein a length of the sweep corresponds to a thickness of the respective layer;

selecting a convex polyhedron in the first set of convex polyhedrons;

imprinting an edge of a convex polyhedron of the second set of convex polyhedrons onto the selected convex polyhedron; and constructing at least two tetrahedrons corresponding to the selected convex polyhedron, each of the at least two tetrahedrons comprising the imprinted edge, and the first set of tetrahedrons comprising the at least two tetrahedrons, thereby forming automatically, without having to enforce any continuity requirements after tetrahedron generation, a mesh of tetrahedrons that is continuous with a second set of tetrahedrons corresponding to the second set of convex polyhedrons;

wherein the second layer is adjacent to both the first and third layers, the first layer is not adjacent to the third layer, and no edges of convex polyhedrons of the third set of convex polyhedrons are imprinted onto the convex polyhedrons of the first set of polyhedrons for constructing tetrahedrons.

16. The article of manufacture of claim 15, wherein the stored instructions further configure the processor to:

select an adjacent convex polyhedron corresponding to an adjacent second layer;

imprint an edge of the adjacent convex polyhedron onto the selected convex polyhedron; and construct a first set of tetrahedrons comprising at least two tetrahedrons corresponding to the selected convex polyhedron, each of the at least two tetrahedrons comprising the imprinted edge, thereby converting, at least in part, the selected polyhedron into the first set of tetrahedrons.

17. The article of manufacture of claim 15, wherein the stored instructions further configure the processor to:

receive and store in the memory a specification of the volumetric object;

identify the first layer of the volumetric object, the first layer corresponding to a first Z co-ordinate;

derive a set of polygons corresponding to a cross-section of the first layer at a Z location;

remove from at least one of the polygons in the set at least one of: (i) an overlap between two polygons in the set, and (ii) an intersection of two polygons in the set, to obtain a non-overlapping, non-intersecting modified set of polygons;

sweep each polygon in the modified set of polygons in a Z direction, to obtain a layer representation of the first layer, the layer representation comprising the first generalized polygon; and store the first generalized polygon in the memory.

* * * * *